United States Patent
Blin et al.

(10) Patent No.: US 8,289,521 B2
(45) Date of Patent: *Oct. 16, 2012

(54) LOW-NOISE FIBER-OPTIC SENSOR UTILIZING A LASER SOURCE

(75) Inventors: Stephane Blin, Lannion (FR); Michel J. F. Digonnet, Palo Alto, CA (US); Gordon S. Kino, Stanford, CA (US); Seth Lloyd, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/027,873

(22) Filed: Feb. 15, 2011

(65) Prior Publication Data

US 2011/0176140 A1    Jul. 21, 2011

Related U.S. Application Data

(63) Continuation of application No. 12/271,760, filed on Nov. 14, 2008, now Pat. No. 7,911,619.

(60) Provisional application No. 60/988,404, filed on Nov. 15, 2007.

(51) Int. Cl.
*G01C 19/72* (2006.01)
(52) U.S. Cl. ........................................................ 356/460
(58) Field of Classification Search .................. 356/459, 356/460, 461, 483
See application file for complete search history.

(56) References Cited

U.S. PATENT DOCUMENTS

| | | | |
|---|---|---|---|
| 4,469,397 | A | 9/1984 | Shaw et al. |
| 4,530,097 | A | 7/1985 | Stokes et al. |
| 4,708,480 | A | 11/1987 | Sasayama et al. |
| 4,773,759 | A | 9/1988 | Bergh et al. |
| 5,153,676 | A | 10/1992 | Bergh |
| 5,530,545 | A | 6/1996 | Pavlath |
| 6,529,444 | B2 | 3/2003 | Vakoc |
| 7,911,619 | B2 | 3/2011 | Blin et al. |
| 2008/0030741 | A1 | 2/2008 | Digonnet et al. |
| 2008/0180681 | A1 | 7/2008 | Digonnet |
| 2010/0302548 | A1 | 12/2010 | Digonnet et al. |

FOREIGN PATENT DOCUMENTS

| | | |
|---|---|---|
| CA | 2532247 | 7/2007 |
| WO | WO 92/11509 | 7/1992 |
| WO | WO 2007/076600 | 7/2007 |

OTHER PUBLICATIONS

Bergh et al., "All-single-Mode fiberoptic gyroscope," Optics Letters, vol. 6, No. 4, pp. 198-200 (1981).

(Continued)

*Primary Examiner* — Michael A Lyons
(74) *Attorney, Agent, or Firm* — Knobbe, Martens, Olson & Bear LLP

(57) ABSTRACT

A fiber-optic sensor includes an optical fiber coil and a laser source optically coupled to the coil. Light from the source is transmitted to the coil as a first optical signal and a second optical signal counter-propagating through the coil. The optical paths of the first optical signal and the second optical signal are substantially reciprocal with one another and the first optical signal and the second optical signal are combined together after counter-propagating through the coil to generate a third optical signal. The laser source is frequency-modulated or can have a coherence length longer than a length of the coil.

21 Claims, 19 Drawing Sheets

OTHER PUBLICATIONS

Bergh, R.A. et al., *Compensation of the Optical Kerr Effect in Fiber-Optic Gyroscopes, Optics Letters*, vol. 7, pp. 282-284 (1982).

Blin, S. et al., "Fiber optic gyroscope operated with a frequency-modulated laser," *Conf. on Optical Fiber Sensors*, Perth, Australia, *Proc. SPIE* vol. 7004, 70044X-1-4 (Apr. 2008).

Blin, S. et al., "Reduced thermal sensitivity of a fiber-optic gyroscope using an air-core photonic-bandgap fiber," *J. Lightwave Techn.*, vol. 25, No. 3, 861-865 (Mar. 2007).

Böhm et al., "Low-drift fibre gyro using a superluminescent diode," Electronics Letters 17(10), pp. 352-353, 1981.

Brinkmeyer, E., "Analysis of the backscattering method for singlemode fibers," *J. Opt. Soc. Am.* vol. 70, 1010-1012 (1980).

Culshaw et al., "Frequency modulated heterodyne optical fiber Sagnac interferometer," IEEE Trans. Microwave Theory and Techniques, Vo. MTT-30, No. 4, pp. 536-539 (1982).

Cutler et al., "Limitation of rotation sensing by scattering," Optics Letters 5(11), pp. 488-490, 1980.

Dangui, V., Doctorate Thesis, "Laser-Driven Air-Core Photonic-Bandgap Fiber Optic Gyroscope," Electrical Engineering Department, Stanford University, Oct. 2007.

Dangui, et al., "Modeling of the propagation loss and backscattering in air-core photonic-bandgap fibers," *IEEE J. Lightwave Technol.* vol. 27, No. 17, 3783-3789 (Sep. 1, 2009).

Dangui, et al., "Phase sensitivity to temperature of the fundamental mode in air-guiding photonic-bandgap fibers," *Optics Express*, vol. 13, No. 18, 6669-6684 (Sep. 5, 2005).

Dangui, V. et al., "Laser-driven photonic-bandgap fiber optic gyroscope with negligible Kerr-induced drift," *Opt. Lett.*, vol. 34, No. 7, 875-877 (Apr. 2009).

Digonnet, M. et al., "Coherent Backscattering Noise in Photonic-Bandgap Fiber Optic Gyroscope," *International Conference on Optical Fiber Sensors*, Edinburgh, Scotland (Oct. 2009).

Giles, I.P. et al., "*Coherent backscatter-induced drift in phase-modulated optical fiber gyroscopes,*" Electron. Lett., vol. 22, No. 9, 494-496 (1986).

Gustavson et al., "Rotation sensing with a dual atom-interferometer Sagnac gyroscope," Class. Quantum Grav., 17, pp. 2385-2398, 2000.

Kim et al., "Fiber-optic gyroscope using an air-core photonic bandgap fiber," Proceedings of the SPIE 5855(1), pp. 198-201, 2005.

Kim, H.K et al., "Air-core photonic-bandgap fiber gyroscope," *J. Lighwave Techn.*, vol. 24, No. 8, 3169-3174 (Aug. 2006).

Kråkenes et al., "Effect of Laser Phase Noise in Sagnac Interferometers," Journal of Lightwave Technology, vol. 11, No. 4, pp. 643-653, Apr. 1993.

Lefèvre, "The Fiber-Optic Gyroscope," pp. 30-43, Artech House, Inc., Norwood (MA), 1993.

Mackintosh, M. and Culshaw, B., "Analysis and observation of coupling ratio dependence of Rayleigh backscattering noise in a fiber optic gyroscope," *J. Lightwave Tech.*, vol. 7, No. 9, 1323-1328 (1989).

Mangan, B.J. et al., "Low loss (1.7 dB/km) hollow core photonic bandgap fibei" in *Proc. Opt. Fiber. Commun. Conf.* (2004), paper PDP24.

Moeller et al., "1.06-μm all-fiber gyroscope with noise subtraction," Optics Letters, vol. 16, No. 23, pp. 1902-1904 (1991).

Nakazawa, M. et. al, "Analyses of optical time-domain reflectometry for single-mode fibers and of polarization optical time-domain reflectometry for polarization-maintaining fibers," *Optics Letters*, vol. 8, No. 2, 130-132 (1983).

Post, "Sagnac effect," Reviews of Modern Physics, vol. 39, pp. 475-493, 1967.

Takada, K., "Calculation of Rayleigh backscattering noise in fiber-optic gyroscopes," *J. Opt. Soc. Am. A*, vol. 2, No. 6 (Jun. 1985).

Wegmuller, M. et al.,"Experimental investigation of the polarization properties of a hollow core photonic bandgap fiber for 1550 nm," *Opt. Expr.*, vol. 13, No. 5, 1457-1467 (Mar. 2005).

Wen, H. et al., "Measurements of the birefringence and Verdet constant in an air-core fiber," *IEEE J. of Lightwave Technol.* vol. 27, No. 15, 3194-3201 (Aug. 2009).

Zheng, "All-fiber single-mode fiber frequency-modulated continuous-wave Sagnac gyroscope," Optics Letters 30, pp. 17-19, Jan. 2005.

Zheng, "Differential birefringent fiber frequency-modulated continuous-wave Sagnac gyroscope," IEEE Photonics Technology Letters, vol. 17, pp. 1498-1500, Jul. 2005.

International Search Report and Written Opinion for PCT/US2008/083699 mailed May 19, 2009.

International Preliminary Report on Patentability for PCT/US2008/083699 mailed Jun. 8, 2010.

Extended Search Report for European Patent Application No. 10250844.7 dated Apr. 24, 2012 in 7 pages.

FIG. 6A
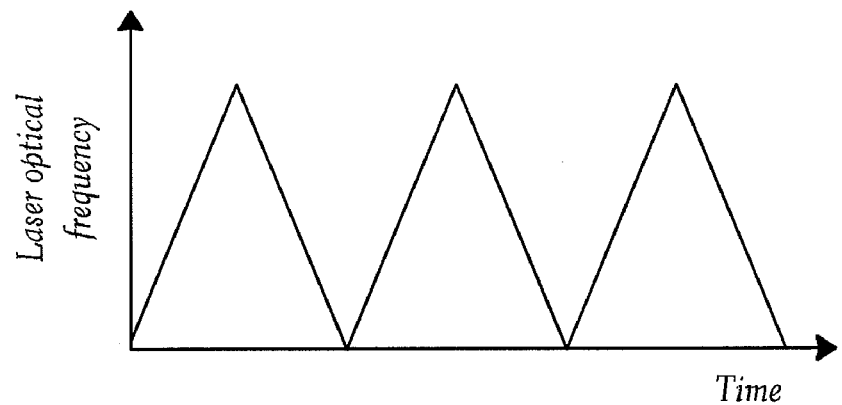
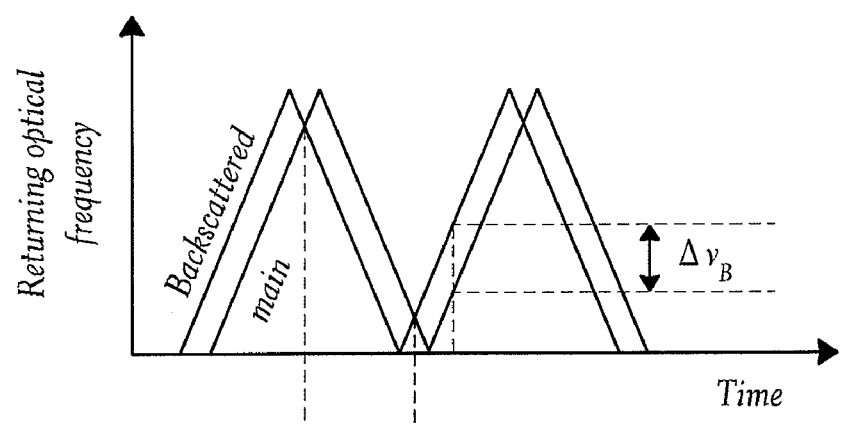
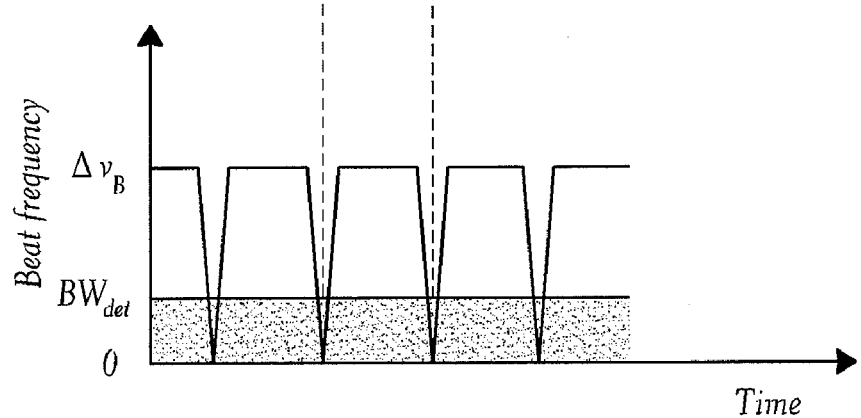
FIG. 6B

LOW-NOISE FIBER-OPTIC SENSOR UTILIZING A LASER SOURCE

CROSS-REFERENCE TO RELATED APPLICATIONS

This application is a continuation of U.S. patent application Ser. No. 12/271,760, filed Nov. 14, 2008 and incorporated in its entirety by reference herein, and which claims the benefit of priority to U.S. Provisional Appl. No. 60/988,404, filed Nov. 15, 2007, which is incorporated in its entirety by reference herein.

BACKGROUND OF THE INVENTION

1. Field of the Invention

This application relates generally to fiber-optic sensors, and more particularly, to fiber-optic gyroscopes.

2. Description of the Related Art

Early experimental demonstrations of the fiber-optic gyroscope (FOG) were obtained using a laser for the optical source. See, e.g., R. A. Bergh, H. C. Lefèvre, and H. J. Shaw, "All-single-mode fiberoptic gyroscope," Optics Letters, vol. 6, no. 4, pp. 198-200 (1981). Shot-noise-limited sensitivity for the FOG was expected (see, e.g., H. C. Lefèvre, "The Fiber-Optic Gyroscope," Artech House, Inc., Norwood, Mass. (1993)), but it was actually observed that the sensitivity was dramatically deteriorated by backscattering in the optical fiber (see, e.g., C. C. Cutler, S. A. Newton, and H. J. Shaw, "Limitation of rotation sensing by scattering," Optics Letters, vol. 5, no. 11, pp. 488-490 (1980)). The replacement of the laser by a superfluorescent source (SFS) (see, e.g., K. Böhm, P. Marten, K. Petermann, E. Weidel, and R. Ulrich, "Low-drift fibre gyro using a superluminescent diode," Electronics Letters, vol. 17, no. 10, pp. 352-353 (1981)) offered a dramatic reduction of this backscattering-induced noise, along with a reduction of other sources of noise due to the Kerr effect, polarization fluctuations, and the Faraday effect.

SUMMARY OF THE INVENTION

In certain embodiments, a fiber-optic sensor comprises an optical fiber coil and a frequency-modulated laser source optically coupled to the coil. Light from the source is transmitted to the coil as a first signal propagating along the coil in a first direction and a second signal propagating along the coil in a second direction opposite to the first direction. The optical paths of the first signal and the second signal are substantially reciprocal with one another and the first signal and the second signal are combined together after propagating through the coil to generate a third signal.

In certain embodiments, a method operates a fiber-optic sensor. The method comprises providing a fiber-optic sensor comprising an optical fiber coil and a laser source optically coupled to the coil. The method further comprises transmitting light from the source to the coil as a first signal and a second signal. The first signal propagates along the coil in a first direction and the second signal propagates along the coil in a second direction opposite to the first direction. The optical paths of the first signal and the second signal are substantially reciprocal with one another. The method further comprises combining the first signal and the second signal together to generate a third signal. The method further comprises modulating a frequency of the laser source such that the first signal and the second signal are frequency-modulated.

In certain embodiments, a fiber-optic sensor comprises a coil of optical fiber having a length and a laser source optically coupled to the coil. The laser source has a coherence length longer than the length of the coil fiber. Light from the source is transmitted to the coil as a first signal propagating along the coil in a first direction and a second signal propagating along the coil in a second direction opposite to the first direction. The optical paths of the first signal and the second signal are substantially reciprocal with one another and the first signal and the second signal are combined together after propagating through the coil to generate a third signal.

In certain embodiments, a method operates a fiber-optic sensor. The method comprises providing a fiber-optic sensor comprising a coil of optical fiber having a length and a laser source optically coupled to the coil. The laser source has a coherence length longer than the length of the coil fiber. The method further comprises transmitting light from the source to the coil as a first signal and a second signal. The first signal propagates along the coil in a first direction and the second signal propagates along the coil in a second direction opposite to the first direction. The optical paths of the first signal and the second signal are substantially reciprocal with one another. The method further comprises combining the first signal and the second signal together to generate a third signal.

BRIEF DESCRIPTION OF THE DRAWINGS

FIG. 6A is a plot of a periodic sawtooth frequency modulation waveform shape in accordance with certain embodiments described herein.

FIG. 6B is a plot of the returning optical frequencies and the beat frequencies for a periodic frequency modulation in accordance with certain embodiments described herein.

DETAILED DESCRIPTION

Broadband sources, such as super-fluorescent sources (SFSs), are commonly used for fiber-optic sensors such as fiber-optic gyroscopes (FOGs) in order to reduce deleterious effects related to the Kerr and Faraday effects, polarization-related non-reciprocity, and noise arising from coherent backscattering. While use of an SFS as the light source has resulted in notable improvements of the sensitivity of the FOG, the sensitivity is still limited by two main disadvantages. One additional source of noise related to the use of a broadband source is the excess-noise due to the beating between the different spectral components of the broadband source at the detector, unless specific excess-noise reduction techniques are used. See, e.g., R. P. Moeller and W. K. Burns, "1.06-µm all-fiber gyroscope with noise subtraction," Optics Letters, vol. 16, no. 23, pp. 1902-1904 (1991) and U.S. Pat. No. 5,530,545, which is incorporated in its entirety by reference herein. Another drawback of the SFS as a light source for the FOG is the difficulty in stabilizing the mean wavelength of the SFS's broadband output. These drawbacks have contributed to the prevention of the FOG from being used in aircrafts as the sole inertial navigation instrument.

Figure 1:
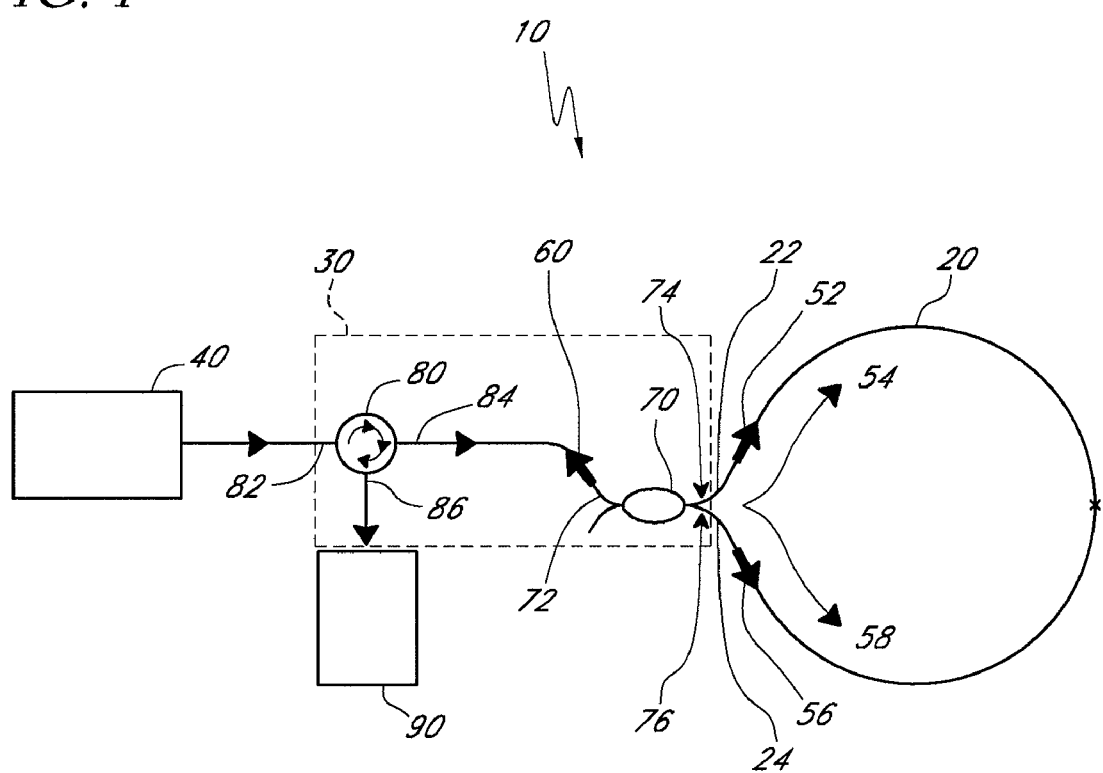
FIG. 1 schematically illustrates an example fiber-optic sensor 10 in accordance with certain embodiments described herein.

FIG. 1 schematically illustrates an example fiber-optic sensor 10 in accordance with certain embodiments described herein. The sensor 10 comprises an optical fiber coil 20 and at least one optical coupler 30 optically coupled to the coil 20. The sensor 10 further comprises a frequency-modulated laser source 40 optically coupled to the at least one optical coupler 30. Light from the laser source 40 is transmitted by the at least one optical coupler 30 to the coil 20 as a first signal 52 propagating along the coil 20 in a first direction 54 and a second signal 56 propagating along the coil 20 in a second direction 58 opposite to the first direction 54. The optical paths of the first signal 52 and the second signal 56 are substantially reciprocal with one another and the first signal 52 and the second signal 56 are combined together by the at least one optical coupler 30 to generate a third signal 60.

In certain embodiments, the fiber-optic sensor 10 is a Sagnac-based fiber-optic sensor, as schematically illustrated by FIG. 1. The sensor 10 of certain embodiments is a FOG that is sensitive to rotations of the coil 20 (e.g., the power carried by the third signal 60 changes as the rate of rotation (e.g., in degrees per hour) applied to the coil 20 varies). In certain other embodiments, the sensor 10 is configured to be sensitive to one or more other perturbations, including but not limited to, acoustic, thermal, and magnetic perturbations. The sensor 10 of certain embodiments thereby provides for detection of one or more of the following: rotational movements, acoustic fields, thermal transients, and magnetic fields. The sensor 10 of certain embodiments is configured to be used for one or more purposes, including but not limited to, as a compass, as a gyrocompass, and as a motion sensor. Persons skilled in the art will recognize that while the majority of the discussion below is presented with regard to FOGs, other fiber-optic sensors are also compatible with certain embodiments described herein.

The coil 20 of certain embodiments comprises a plurality of substantially concentric loops. In certain embodiments, the coil 20 comprises a conventional optical fiber (e.g., a single-mode fiber such as the SMF-28® optical fiber available from Corning, Inc. of Corning, N.Y.). In certain other embodiments, the coil 20 comprises an air-core optical fiber (e.g., a hollow-core photonic bandgap fiber such as the HC-1550-02 optical fiber available from Crystal Fibre A/S of Birkerød, Denmark). In certain embodiments, the air-core optical fiber advantageously provides a reduction of one or more of the Kerr effect, the Faraday effect, and the Shupe (thermal) effect, as compared to conventional optical fibers. See, e.g., U.S. Pat. Appl. Publ. No. 2008/0030741 A1 and H. K. Kim, V. Dangui, M. Digonnet, and G. Kino, "Fiber-optic gyroscope using an air-core photonic-bandgap fiber," Proceedings of the SPIE, vol. 5855, no. 1, pp. 198-201 (2005), each of which is incorporated in its entirety by reference herein. If the Kerr effect is still too large and thus introduces a detrimental phase drift that degrades the performance of the fiber optical system, other methods can also be employed to reduce the Kerr effect in a fiber optic system implemented in a Sagnac interferometer including a narrowband source com risin a light-emitting device in combination with an am litude modulator. The optical signal from the light-emitting device is modulated by the amplitude modulator. In certain embodiments the amplitude modulator produces a square-wave modulation, and in certain embodiments, the resulting light output from the narrowband source has a modulation duty cycle of about 50%. The modulation is maintained in certain embodiments at a sufficiently stable duty cycle. As discussed, for example, in U.S. Pat. No. 4,773,759, and in R.A. Bergh et al., *Compensation of the Optical Kerr Effect in Fiber-Optic Gyroscopes, Optics Letters*, Vol. 7, 1992, pages 282-284, such square-wave modulation effectively cancels the Kerr effect in a fiber-optic gyroscope. However, the backscattering coefficient of existing air-core optical fibers is actually higher than that in conventional solid-core optical fibers (by up to about one order of magnitude), thereby severely limiting the sensitivity of a laser-driven air-core fiber-optic sensor (e.g., FOG). However, with straightforward technical improvements, air-core optical fibers can have a dramatically reduced backscattering level which is much lower than prevails in current air-core fibers. For example, one method for reducing backscattering of an air-core optical fiber is to increase the diameter of the fiber core, e.g., by removing 19 tubes from the fiber preform to form the core, rather than 7 as is done for most current air-core optical fibers. A second method includes designing the fiber such that it has a wider bandgap. This can be accomplished, for example, by increasing the fiber's air-filling ratio. A third approach for reducing the level of backscattering is to increase the speed at which the fibers are drawn, which in itself requires adjusting other fabrication and preform parameters, such as the temperature of the melt zone, the pressure of the gas applied to the preform's tubes, the viscosity and/or composition of the glass, etc. These methods of reducing backscattering in an air-core optical fiber, and their physical origin and mathematical justifications (in some cases), can be found in Vinayak Dangui's Doctorate Thesis, Laser-Driven Air-Core Photonic-Bandgap Fiber Optic Gyroscope, Electrical Engineering Department, Stanford University, October 2007, in particular in Section 5.3.7, which is incorporated in its entirety by reference herein. Other optical fibers are also compatible with various embodiments described herein.

In certain embodiments, as schematically illustrated by FIG. 1, the at least one optical coupler 30 comprises a first optical coupler 70 comprising a first port 72, a second port 74, and a third port 76. For example, the first optical coupler 70 can comprise a 3-dB optical coupler, as schematically illustrated in FIG. 1. The first optical coupler 70 of certain embodiments comprises additional ports. In certain embodiments, the second port 74 is optically coupled to a first end 22 of the coil 20 and the third port 76 is optically coupled to a second end 24 of the coil 20, as schematically illustrated by FIG. 1. Light generated by the laser source 40 received at the first port 72 is split into the first signal 52 and the second signal 56. The first signal 52 is transmitted by the second port 74 to the first end 22 of the coil 20 to propagate in the first direction 54 (e.g., clockwise) along the coil 20, and is transmitted by the second end 24 of the coil 20 and the third port 76 to the first port 72. The second signal 56 is transmitted by the third port 76 to the second end 24 of the coil 20 to propagate in the second direction 58 (e.g., counterclockwise) along the coil 20, and is transmitted by the first end 22 of the coil 20 and the second port 74 to the first port 72. Thus, the first signal 52 and the second signal 56 counterpropagate through the coil 20 and are recombined together by the first optical coupler 70.

In such a configuration, the optical paths of the first signal 52 and the second signal 56 are substantially reciprocal with one another. The term "reciprocal" as used herein includes its broadest reasonable interpretation, including, but not limited to, optical paths which have substantially the same optical length and which have substantially equal responses to perturbations (e.g., thermal variations). For example, for light traveling from a first state ("state" including polarization state, phase, but not amplitude) at point A to a second state at point B, light propagation is reciprocal if upon reversing the direction of light at point B, the light (now starting in the second state at point B) gets back to point A again in the first state. For certain embodiments described herein, because the two signals 52, 56 travel along the same optical path, their propagation is basically or substantially reciprocal such that the phase accumulated by the first signal 52 as it travels around the entire coil 20 in one direction is equal to the phase accumulated by the second signal 56 as it travels around the entire coil 20 in the opposite direction. This reciprocity would be absolute in the absence of nature's very few non-reciprocal effects, such as the Faraday effect (resulting from exposure to a magnetic field) and the Sagnac effect (resulting from exposure to a rotation), and in the absence of asymmetric time-dependent effects (such as dynamic perturbations, e.g., pressure or temperature variations), applied asymmetrically to any fraction or all of the sensing coil 20. However, this reciprocity is not absolute unless nonreciprocal effects are all exactly zero, which means, in particular, that the two signals 52, 56 must be in the same state of polarization (SOP) at every point along the coil 20 (although the SOP of each signal does not have to be the same at every point along the coil 20). In this context, the term "substantially reciprocal" recognizes that canceling these residual non-reciprocal effects is never complete. Examples of systems comprising substantially reciprocal optical paths include, but are not limited to, common-path interferometers and common-mode interferometers. Examples of non-reciprocal optical paths are found in J. Zheng, "All-fiber single-mode fiber frequency-modulated continuous-wave Sagnac gyroscope," Optics Letters, Vol. 30, pp. 17-19 (2005) which discloses an unbalanced interferometer.

In certain embodiments, as schematically illustrated by FIG. 1, the at least one optical coupler 30 further comprises a second optical coupler 80 comprising a first port 82, a second port 84, and a third port 86. The second optical coupler 80 of certain embodiments comprises additional ports. For example, the second optical coupler 80 can comprise an optical circulator, as schematically illustrated by FIG. 1. In certain embodiments, the first port 82 receives light generated by the laser source 40 (e.g., the first port 82 is optically coupled to the laser source 40), the second port 84 is optically coupled to the first port 72 of the first optical coupler 70, and the third port 86 is optically coupled to a detection system 90. Light received by the first port 82 from the laser source 40 is transmitted through the second port 84 to the first port 72 of the first optical coupler 70. Light (e.g., the third signal 60) received by the second port 84 from the first port 72 of the first optical coupler 70 is transmitted through the third port 86 to the detection system 90. Other configurations of the at least one optical coupler 30 are also compatible with certain embodiments described herein. For example, the at least one optical coupler 30 can comprise additional or fewer optical elements, and the second optical coupler 80 can comprise a 3-dB optical coupler. As described more fully below, in certain embodiments, the sensor 10 can comprise a polarizer which can be used advantageously to achieve polarization reciprocity.

When the coil 20 is not rotated, the first signal 52 and the second signal 56 returning to the first port 72 after propagating through the common-path interferometer formed by the coil 20 and the first coupler 70 are recombined in phase. If a dynamic perturbation is applied to the coil 20 anywhere but in the mid-point of the coil 20 (identified by a small cross on the coil 20 of FIG. 1), the counterpropagating first signal 52 and second signal 56 experience a phase differential. When the two signals 52, 56 are recombined by the at least one optical coupler 30 at the port 72, this phase differential results in an amplitude differential in the third signal 60 at the port 72, which is detected by the detector system 90. This amplitude differential contains the information about the perturbation. A rotation of the coil 20 also induces a phase shift whose amplitude is proportional to the rotation rate. When the sensor 10 is not perturbed (e.g., when the FOG is without rotation), the signal returning from an ideal FOG contains spectral components at even multiples of the modulation frequency (dc included), but does not return any signal at $f_0$. However, any perturbation, including backscattering noise, will induce a component at $f_0$. Thus, the signal of interest in certain embodiments is modulated at $f_0$.

In certain embodiments, the laser source 40 has a mean wavelength in a range between about 1.48 μm and about 1.6 μm. The mean wavelength of the laser source 40 of certain embodiments is stable to within about one part per million or better. The greater stability of the mean wavelength of certain embodiments, as compared to an SFS, advantageously provides a greater scale-factor stability for the FOG. In certain embodiments, the laser source 40 comprises a laser having a narrow bandwidth such that its coherence length is equal to the length of the coil 20 or less. In certain embodiments, the bandwidth of the laser source 40 is sufficiently narrow such that the sensor 10 is substantially free from excess noise due to beating between the spectral components of the laser source 40 (e.g., the excess noise is below the shot noise of the detected signal). Examples of lasers compatible with certain embodiments described herein include, but are not limited to, external-cavity semiconductor diode lasers and distributed feedback fiber lasers. In certain embodiments, the distributed-feedback fiber laser is more suitable since it is more compact and robust than an external-cavity semiconductor diode laser. In certain embodiments, the laser frequency is modulated in some pattern (e.g., sinusoidal, saw-tooth, etc.) at a selected frequency $f_m$.

Coherent backscattering due to the interaction between light and inhomogeneities in the local index of refraction of a medium is known to be a primary noise source in a variety of Sagnac interferometer-based sensors such as fiber optic gyroscopes, acoustic sensors, etc. When light encounters such a local inhomogeneity, it is scattered in various directions. The portion of the scattered light in the reverse direction that is within the acceptance cone of the fiber will couple into the reverse propagating mode. Upon exiting the coil, this light will interfere with each of the primary waves, producing an error signal. The optical paths of the scattered light and the primary light are no longer reciprocal, so that local variations in the fiber propagation constant due to temperature transients or fluctuating magnetic fields, as well as phase fluctuations in the source will cause the error signal due to backscattering to fluctuate in time when the interference that occurs is coherent. The root mean square (RMS) fluctuations in this error signal limit the minimum sensitivity of Sagnac-loop-based sensors such as the FOG. In the case of the FOG, this type of noise is often characterized by the FOG random walk, given in units of deg/√hr.

Figure 2:
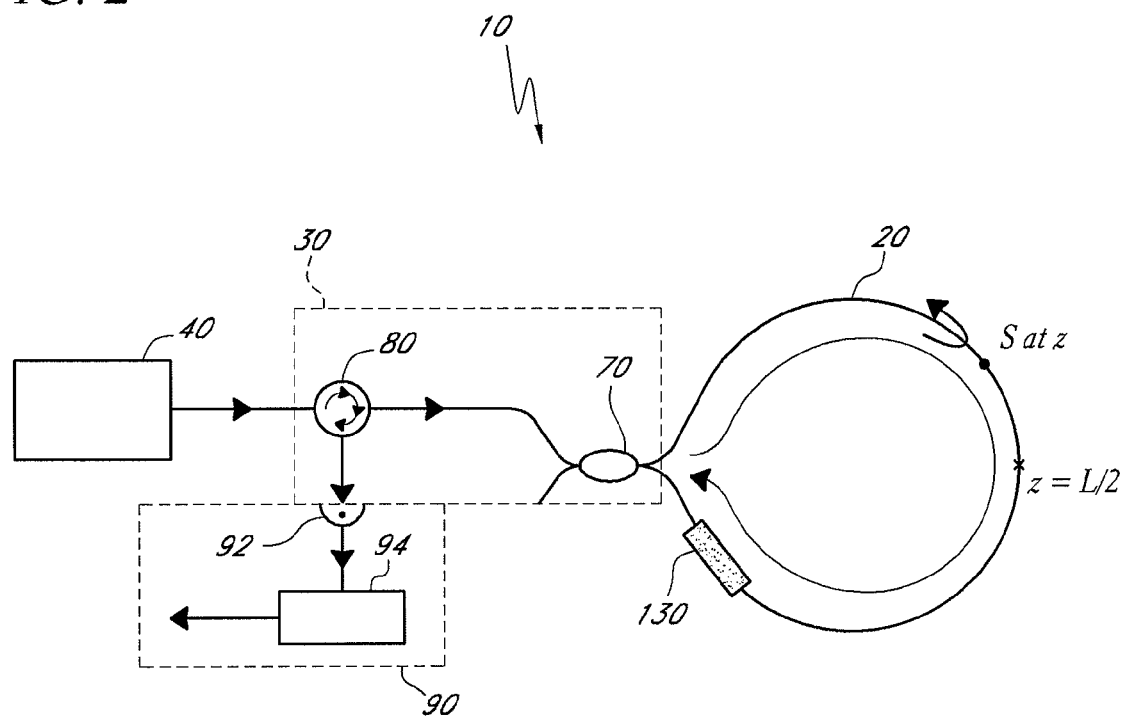
FIG. 2 schematically illustrates a single scatterer S in the optical fiber coil of a Sagnac fiber-optic sensor in accordance with certain embodiments described herein.

In certain embodiments, the frequency-modulated laser source 40 advantageously provides a reduction of the excess noise (and thus improved sensitivity, e.g., to rotation for a FOG), and in certain embodiments, provides a reduction of the backscattered noise. FIG. 2 schematically illustrates a single scatterer S at a position z in the optical fiber coil 20 of a Sagnac fiber-optic sensor 10 in accordance with certain embodiments described herein. The coil 20 schematically illustrated by FIG. 2 includes a phase modulator 130, as described more fully below. In certain embodiments, the phase modulator 130 biases the interferometer in quadrature, as described in H. C. Lefèvre, "The Fiber-Optic Gyroscope," Artech House, Inc., Norwood, Mass. (1993). The sensor 10 of FIG. 2 is an example of a fiber-optic gyroscope comprising a standard Sagnac loop, which comprises a coil 20 closed upon itself by an optical coupler, e.g., a 3-dB fiber coupler. In certain embodiments, the period of the phase modulation by the phase modulator 130 is twice the time-of-flight in the coil 20, and the frequency of this phase modulation is referred to as the proper frequency $f_0$ of the sensor 100. In certain embodiments, the modulation frequency of the phase modulator 130 is equal to the proper frequency $f_0$ of the coil 20. This selection of frequency has a number of advantageous benefits, including maximizing the sensitivity of the FOG to rotation, as described by H. C. Lefèvre, cited above. Another beneficial effect of this phase modulation is that when the coil is rotated, the interference signal caused by this rotation at the output of the coil is centered at frequency $f_0$.

Backscattering noise arises from the interaction at the detector of the first signal 52 and the generally weaker signal generated by backscattering of the second signal 56 off scatterers (e.g., the scatterer S at position z). The small amount of backscattered light travels back to the at least one optical coupler 30, where it interferes with the first signal 52, thus generating noise on the first signal 52 (due to the random character of both the phase of the photons in the first signal 52 and the phase and amplitude of the reflection off the scatterer). Since in this direction, by the time they interact both the first signal 52 and the backscattered signal have traveled through the phase modulator 130, the spurious signal resulting from their interference occurs at frequency $f_0$. Since the rotation-induced signal on the FOG output signal also occurs at $f_0$ (see, H. C. Lefèvre, cited above), this spurious signal is indistinguishable from the rotation signal of the FOG, and it therefore constitutes a source of error. In the opposite direction, the main difference, in the example sensor 10 of FIG. 2, is that by the time the second signal 56 and the backscattered signal due to backscattering of the first signal 52 off scatterers interact, only the second signal 56 has traveled through the phase modulator 130. The reason is two fold. First, the backscattered signal was generated from the first signal 52 backscattering from the scatterer at position z, which occurs at a time when the first signal 52 had not yet traveled through the phase modulator 130 and thus had not yet been modulated. Second, because this particular backscattered signal travels counterclockwise, it also never travels through the phase modulator 130. As a result, in this particular configuration, the second signal 56 does not carry any coherent backscattering noise at $f_0$.

Because this interference process between main and backscattered signals is coherent, only scatterers located along a segment of the coil 20 centered on the coil's midpoint and along a length of the coil 20 approximately equal to the coherence length of the source 40 contribute to the coherent backscattering. The scatterers located along the rest of the coil 20 produce a backscattered signal that is not temporally coherent with the main signal, thereby producing intensity noise, instead of phase noise. This noise is considerably weaker than coherent backscattering noise. In a Sagnac interferometer utilizing a broadband source, which has a short coherence length (typically tens of microns), the coherent backscattering noise is therefore very weak. As pointed out earlier, when such a source is used, the dominant noise of source is typically excess noise, not backscattering noise. On the other hand, utilizing a narrow-bandwidth laser source instead of a broadband source can result in dramatically enhanced noise due to the greater portion of the optical fiber coil 20 that produces coherent backscattering noise, because the coherence length of the laser source (typically 1 cm or longer, and usually much longer, up to thousands of km) is considerably longer than that of a broadband source. The coherence length of the laser source can be typically a fraction of the length of the optical fiber coil 20 (e.g., 0.1% of the length of the coil 20, which can be a few hundred meters or longer) or longer. Therefore, all the scatterers along the optical fiber coil 20 contribute to the coherent backscattering noise.

Figure 3B:
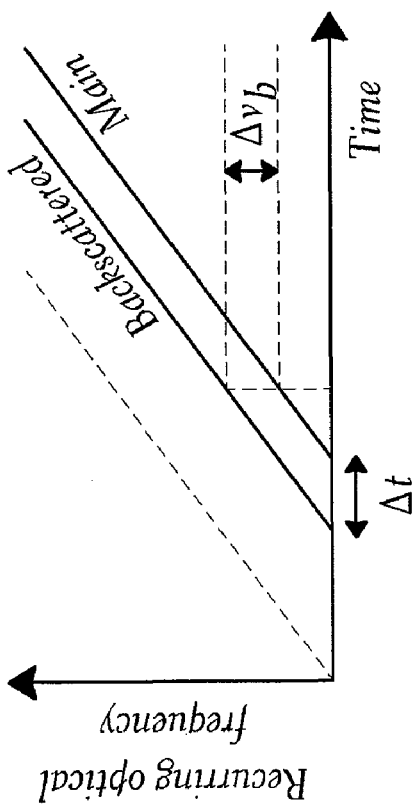
FIG. 3B is a plot of the shifted frequencies of the backscattered and main signals in accordance with certain embodiments described herein.
Figure 3A:
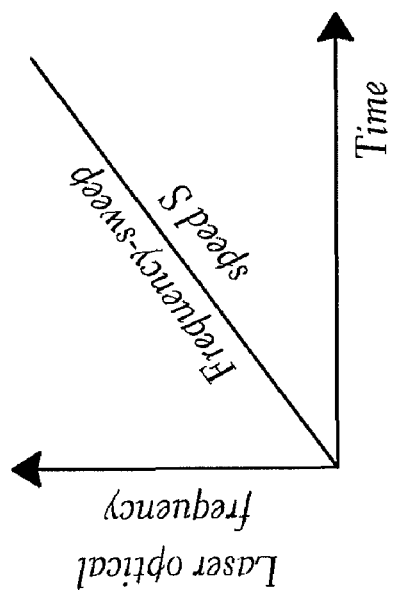
FIG. 3A is a plot of a linearly swept frequency of the laser source in accordance with certain embodiments described herein.

In certain embodiments, this backscattering noise is advantageously reduced by sweeping or modulating the frequency of the laser source 40 and filtering the detected signal. A linearly swept frequency $v_1(t)$ of the laser source 40 is shown in FIG. 3A and can be expressed as $v_1(t)=S \cdot t$, where S is the speed of the frequency sweep in Hz/s and t is the time in seconds. As evident from FIG. 2, the main signal does not return from the coil 20 at the same time as does the backscattered signal. The delay $\Delta t$ between the two depends on the position of the scatterer and can be expressed as $\Delta t = n \cdot (L-2z)/c$, where z is the position of the scatterer in the coil 20, L is the length of the coil 20, n is the refractive index of the coil 20, and c is the speed of light. Consequently, at a given time, the backscattered and main signals have different optical frequencies, as shown in FIG. 3B. Consequently, when they interfere, they produce a beat signal at the detector system 90 with a frequency that is no longer at $f_0$ for most scatterers. Specifically, the signal that has traveled clockwise (cw) around the coil 20 in FIG. 2, and the backscattered signal with which it interferes (which originates from backscattering of the counterclockwise signal), have both traveled through the phase modulator 130 when they interfere, so the frequency of their beat note is $f_0+\Delta v_B$ where $\Delta v_B$ can be expressed as $\Delta v_B=S\cdot n\cdot(L-2z)/c$. In contrast, in the opposite direction, at the output of the coil 20, the signal that has traveled counterclockwise (ccw) around the coil 20 has gone through the phase modulator 130, but the backscattered signal with which it interferes (which originates from backscattering of the cw signal) has not. Consequently, when they interfere, the frequency of their beat note is $\Delta v_B$, i.e., it is not in the vicinity of $f_0$ but in the vicinity of dc. Thus, this beat note does not contribute to coherent backscattering noise around $f_0$. The frequency of the beat signal is indicative of the position of the scatterer. The Fourier transform of the returning spectrum gives a spatial characterization of the scatterers along the coil 20 relative to the center of the coil 20. Two scatterers whose positions are symmetric relative to the center of the coil 20 are not discernible.

Thus, in certain embodiments, as a result of the combination of the configuration and the frequency modulation or sweep of the laser frequency, the deleterious backscattering noise is modulated at a beat frequency of $f_0+\Delta v_B$ while the signal of interest is at frequency $f_0$. In other words, by sweeping the frequency of the laser source 40, the energy in the backscattering noise is shifted to a frequency different from the main signal frequency, thus allowing suppression of the backscattered noise by spectral filtering. This filtering of the signal at the detector system 90 is performed at the output of the optical detector 92 by a band-pass or low-pass filter 94 centered at $f_0$ and with a cut-off bandwidth $BW_{det}$ smaller than the beat frequency shift $\Delta v_B$. This filter does not transmit the noise beat note, thereby advantageously reducing the contribution of backscattered noise to the signal at the detection system 90. This filter 94 can comprise a lock-in amplifier, for example, or equivalent electronic filters. This type of filter is already used in existing FOGs to detect the rotation-induced signal at $f_0$ and to filter it from other sources of noise, so persons skilled in the art will know how to select an appropriate filter 94 in view of the disclosure herein. In certain embodiments in which the fiber-optic sensor 10 is used to sense dynamic perturbations (e.g., acoustic waves), the cut-off bandwidth $BW_{det}$ is selected to be higher than the frequency of the perturbation. Cutoff bandwidth can be, for example, in the range of a fractional Hz to a kHz or higher.

Figure 4:
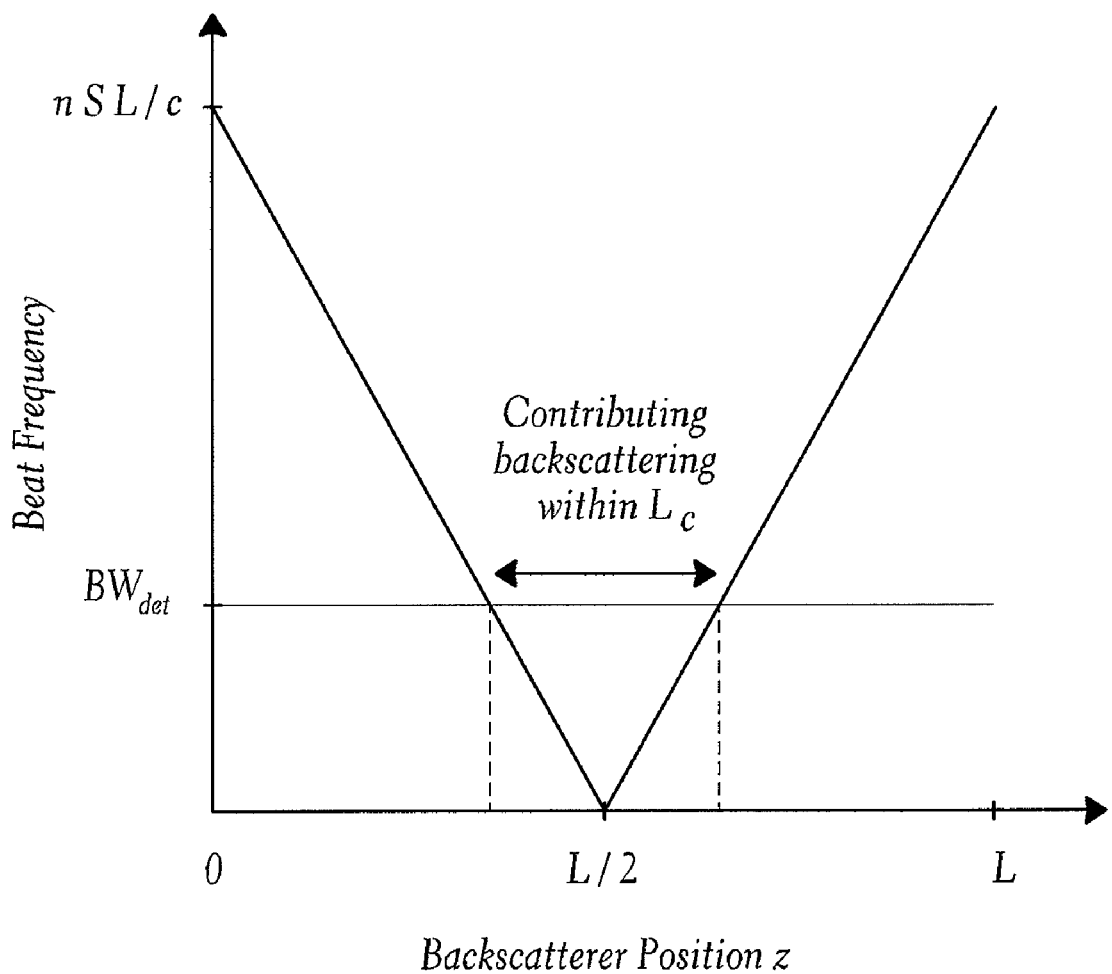
FIG. 4 is a plot of the dependence of the beat frequency of the backscattered noise with the scatterer position in accordance with certain embodiments described herein.

As shown in FIG. 4, for a given cut-off bandwidth $BW_{det}$, the only deleterious scatterers are located within an equivalent coherence length $L_c$ around the center of the coil 20, where $L_c$ can be expressed as $L_c=BW_{det}\cdot c/(n\cdot S)$. It is easy to make this effective length considerably shorter than the typical length of the coil 20. For example, for a bandwidth of 1 Hz and a sweep rate of 20 nm/s (which is straightforward to accomplish), $L_c$ is only 80 µm, independently of the actual coherence length of the source; this is true, for example, even if the coherence length of the source 40 is equal to the length of the coil 20, which can be hundreds of meters or even several kilometers. For coherent backscattering, the frequency-modulated laser source 40 therefore appears to have a coherence length comparable to that of a typical SFS (e.g., a few tens of microns), even though its actual coherence length may be longer by orders of magnitude.

This analysis illustrates that the backscattering noise reduction provided by certain embodiments does not depend on the optical bandwidth over which the laser source 40 is swept, but only on S, the speed of the frequency sweep. Therefore, in certain embodiments, it is advantageous to achieve a given rate S by utilizing a fast modulation of the frequency of the laser source 40 over a small optical bandwidth. One of these advantages is that it is not required to sweep the laser frequency over an optical bandwidth as wide as that of a broadband source. In other embodiments, it is advantageous to achieve a given rate S by utilizing a low modulation of the frequency of the laser source 40 over a large optical bandwidth. This is advantageous when it is easier to tune the laser over a large bandwidth at a low rate, as may be imposed for example by the laser dynamics. For example, a distributed feedback fiber laser exhibits slow relaxation frequencies (e.g., hundreds of kHz), so in certain embodiments utilizing such a laser, it may be preferable to sweep the frequency slowly over a large bandwidth.

As pointed out earlier, the important metric in how much the coherent backscattered noise is reduced is the frequency sweep rate S. S determines the frequency shift between the rotation-induced signal frequency $f_0$ and the noise peak, which is shifted on both sides of $f_0$ as a result of the frequency modulation applied to the laser source 40. There are two locally optimum modes of operation of the sensor 10 in terms of the value of S to select for use in certain embodiments. In order to decrease the backscattering noise at $f_0$ as much as possible, the noise peak can be shifted as far away from $f_0$ as possible. In certain embodiments, the noise peak is shifted in a first mode of operation by selecting the frequency sweep rate S to be as large as possible, resulting in a $\Delta v_B$ that is much greater than $f_0$. In some lasers, this first mode of operation may be difficult to implement, for example when the laser bandwidth is too small or the laser dynamic is too slow, making it difficult or even impossible to accomplish a large sweep rate S. In certain embodiments, the sensor 10 can be operated using the rotation-induced signal at odd harmonics of $f_0$ (e.g., $f_0$, $3f_0$, $5f_0$, etc.).

For these practical reasons, or for some other reasons, in certain embodiments, another mode of operation can be used. As the frequency modulation is increased from 0, as described above, the noise peak at $f_0$ is split into two peaks located on either side of $f_0$, namely at $f_0\pm\Delta v_B$. But the same splitting occurs at all the noise peaks, which are located at dc and all harmonics of $f_0$ ($2f_0$, $3f_0$, etc.). Thus, the noise peak that was originally at $f_0$ is frequency-shifted away from the useful rotation-induced signal at $f_0$, but the noise peak that was originally at dc is frequency-shifted towards $f_0$. The optimum modulation frequency in this second mode of operation is to provide a beat frequency $\Delta v_B=f_0/2$ (corresponding to $S=c^2/(4n^2L^2)$). This second mode of operation is locally optimum because at this frequency shift $\Delta v_B=f_0/2$, both the noise peak that was at dc and the noise peak that was at $f_0$ are frequency-shifted to $f_0/2$, i.e., midway between dc and signal frequency $f_0$. Further increasing the modulation frequency (i.e., above $f_0/2$) would move the original noise peak that was at $f_0$ further away from $f_0$, which would reduce the noise at $f_0$, but it would also move the original noise peak that was at dc closer to $f_0$, which would increase the noise. Since the amplitude of the noise peak at dc is greater than it is at $f_0$, the net result would be an increase in backscattering noise at $f_0$. Therefore, the optimum rate in this second mode of operation is $S=c^2/(4n^2L^2)$. For example, for a 200-m long fiber coil and a refractive index of 1.45, the condition on the sweep speed is S=268 GHz/s, or about 2.1 nm/s for a signal wavelength of 1.55 µm. Examples of laser sources 40 which can be used to provide this frequency sweep speed include, but are not limited to, an external-cavity semiconductor diode laser (e.g., up to 100 nm/s).

For the first mode of operation, as the beat frequency is increased well above $f_0$, the noise peaks originally located at dc, $f_0$, and all higher harmonics of $f_0$, shift and spread out in frequency sufficient to overlap with the signal peak at $f_0$. Two effects then contribute to the noise level at $f_0$. First, more noise peaks contribute to the noise at $f_0$, which increases the noise level at $f_0$. Second, the energy in the noise peaks originally at $f_0$ and dc spreads out and loses amplitude at $f_0$, which decreases the noise level at $f_0$. Because the noise peaks at higher harmonics have amplitudes that decrease as the order of the harmonics increases, the first contribution is weaker than the second one, and therefore the net effect of increase the increasing the frequency shift to very high values is to decrease the noise at $f_0$.

Figure 5B:
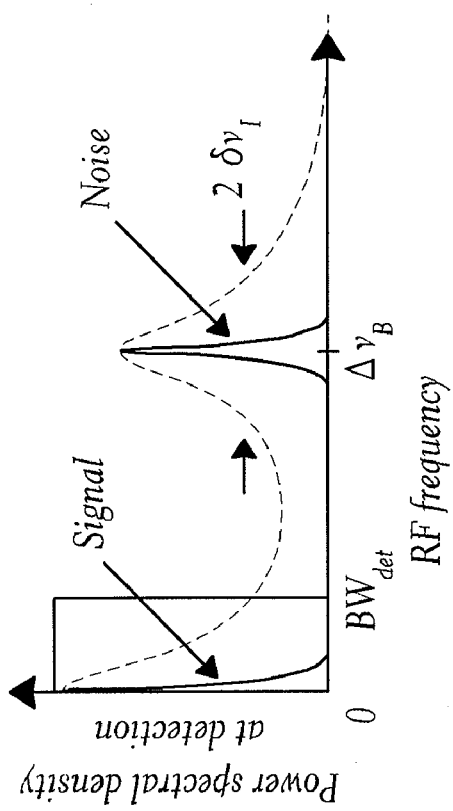
FIG. 5B is a plot of the electrical linewidth of the beat signal in accordance with certain embodiments described herein.
Figure 5A:
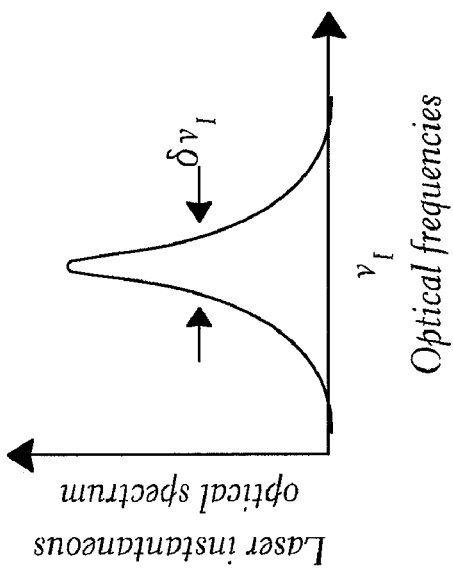
FIG. 5A is a plot of the optical linewidth of the laser source in accordance with certain embodiments described herein.

FIGS. 5A and 5B illustrate a comparison of the optical linewidth of the laser source 40 and the electrical linewidth of the beat signal. As shown in FIG. 5A, the laser source 40 has an optical frequency $v_I$ and an optical linewidth $\delta v_I$. The spectral linewidth of the beat signal between two uncorrelated lasers operating at different optical frequencies is the sum of the linewidths of the lasers. However, the beat signal linewidth tends to zero if the laser signals are correlated. In the context of the fiber-optic sensor 10 shown in FIG. 2, the two beating optical signals are correlated when the delay between these signals is shorter than the coherence time of the laser source 40. Therefore, in certain embodiments in which the laser coherence length is longer than the coil 20, the backscattered and the main signals are correlated, and the beat signal will present an electrical linewidth significantly smaller than the optical linewidth $\delta v_I$ of the laser source 40, as shown by the solid line in FIG. 5B. The dashed line in FIG. 5B illustrates a worst-case scenario in which the beat signals are uncorrelated, resulting in a linewidth of $2\delta v_I$.

Figure 5C:
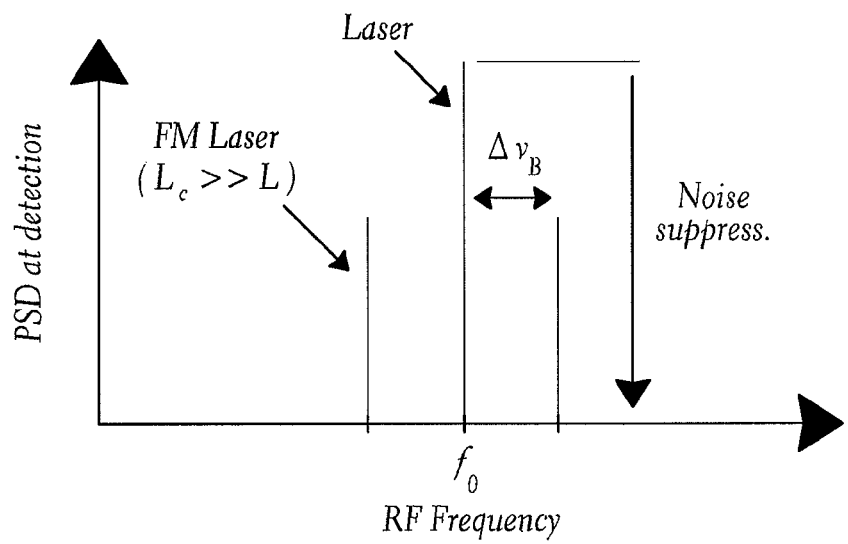
FIGS. 5C-5E illustrate the proper frequency $f_0$ and the beat frequency $\Delta v_B$ for various levels of coherence of the laser source.
Figure 5D:
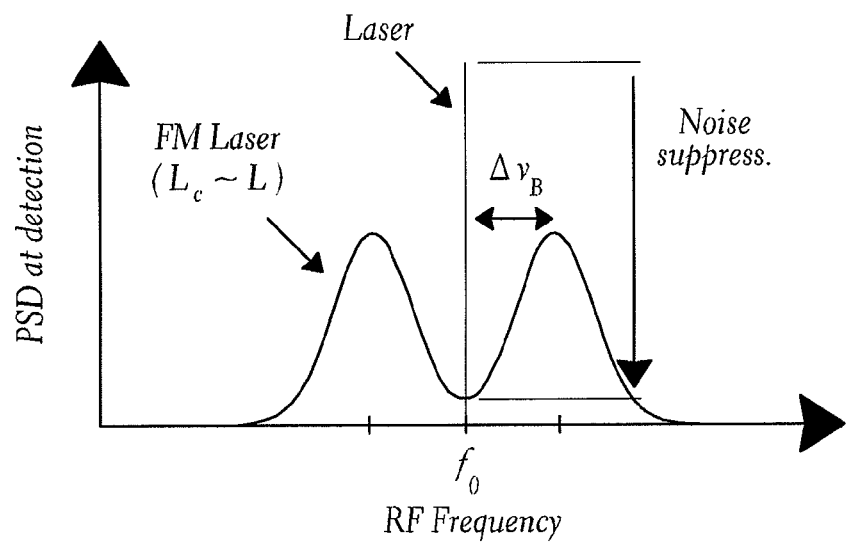
Figure 5E:
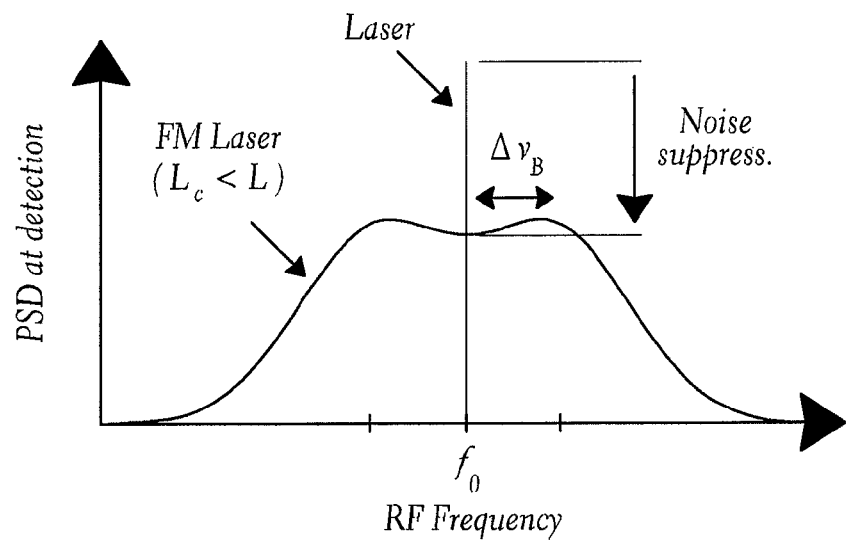

FIGS. 5C-5E illustrate the proper frequency $f_0$ and the beat frequency $\Delta v_B$ for various levels of coherence of the laser source 40. For a highly coherent laser source 40 ($L_c \gg L$, as shown in FIG. 5C), the beat signals between the return signals and the coherent backscattered signals is very narrow, and filtering can yield a high noise suppression. As the coherence length drops (as shown in FIGS. 5D and 5E), the beat signals broaden, and they overlap increasingly at $f_0$, and the noise suppression is less effective.

In certain embodiments in which the linewidth of the beat signal is less than the beat frequency $\Delta v_B$, the backscattering noise can be filtered out using a low-pass filter (e.g., a filter having a cut-off bandwidth $BW_{det}$) or a bandpass filter. Therefore, in certain embodiments, the laser source 40 has a coherence length larger than the coil 20, such that the linewidth of the beat signal is reduced, and the backscattering noise in the resultant signal can be more effectively reduced by spectral filtering. For example, for a 200-m long fiber coil, the condition that the optical linewidth $\delta v_I$ be much less than c/L is satisfied by having $\delta v_I \ll 1.5$ MHz. Such optical linewidths can be provided by external-cavity semiconductor diode lasers (typically having linewidths of a few hundreds of kHz) or single-mode fiber lasers (typically having linewidths of a few tens of kHz).

The frequency of the laser source 40 cannot be infinitely increased, so in certain embodiments, a periodic modulation is applied (e.g., a sawtooth frequency modulation waveform shape as illustrated in FIG. 6A). The frequency $f_{sweep}$ of this frequency modulation in certain embodiments is advantageously selected to be much higher than the filter bandwidth $BW_{det}$ of the detection system 90. As illustrated by FIG. 6B, for periodic frequency modulation, the beat frequency $\Delta v_B$ between the main signal and the backscattered signal tends to zero around the wrapping portions of the frequency modulation (specifically, at any of the points where the backscattered curve and the main curve cross in the top graph of FIG. 6B), since it is near these intersection points that the returning main signal and the returning backscattered signal have substantially equal frequencies. Consequently, the reduction of the beat frequency in the vicinity of these points effectively moves part of the backscattering noise into the detection bandwidth, thus increasing the remaining backscattering noise at these points. The magnitude of this unfiltered noise can be reduced in certain embodiments by increasing the optical bandwidth over which the laser source 40 is swept, thus increasing the duty cycle of the time dependence of the beat frequency, or equivalently reducing the number of intersection points per unit time. The higher the bandwidth, the fewer the number of wrappings (or crossing points) per unit time, and thus the greater the noise reduction.

Examples of laser sources 40 compatible with certain such embodiments include, but are not limited to, external-cavity semiconductor diode lasers (e.g., which can be swept by 100 nm) and distributed-feedback fiber lasers (e.g., which can be swept at high speed using piezo-electric ceramics by over 10 nm by stretching the fiber, and over 90 nm by compression of the fiber). For example, the frequency modulation of the laser source 40 can be provided by using a narrow-linewidth (e.g., a single-frequency) semiconductor laser diode, of which several varieties exist, and by modulating the laser-diode drive current. This is well known to produce a slight modulation of the laser frequency, at the frequency applied to the drive current. This frequency controls the sweep rate, while the amplitude of the current modulation controls the amplitude of the laser frequency modulation.

Figure 7:
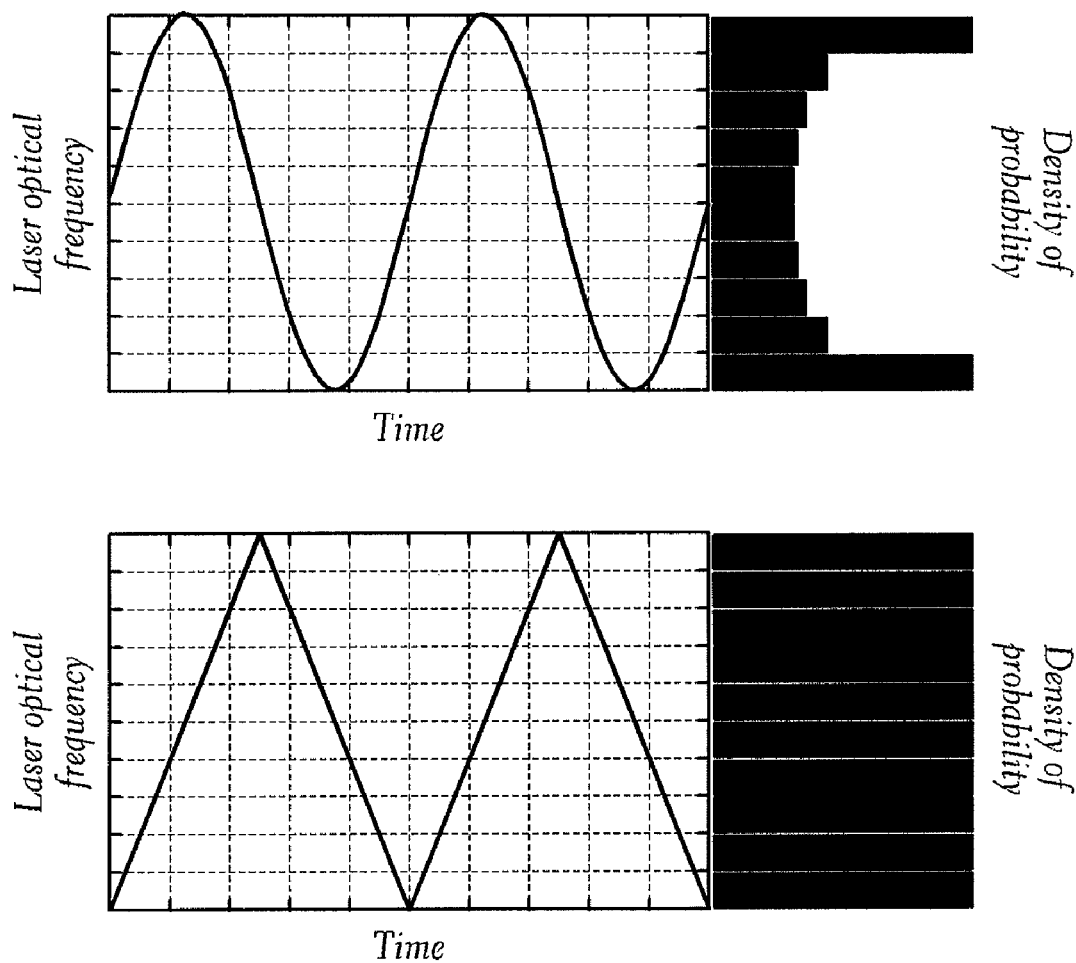
FIG. 7 is a plot of the density of probability of a sawtooth waveform and of a sine waveform.

Other frequency modulation waveform shapes (e.g., sinusoidal) are also compatible with certain embodiments described herein. In certain embodiments, the frequency modulation waveform shape is chosen to have a flat density of probability (e.g., as does a sawtooth). FIG. 7 compares the density of probability of a sawtooth waveform and a sinusoidal waveform. The sinusoidal frequency modulation waveform shape would dramatically increase the magnitude of the backscattering noise since its density of probability is largest near the extrema of the sine waveform.

Figure 8A:
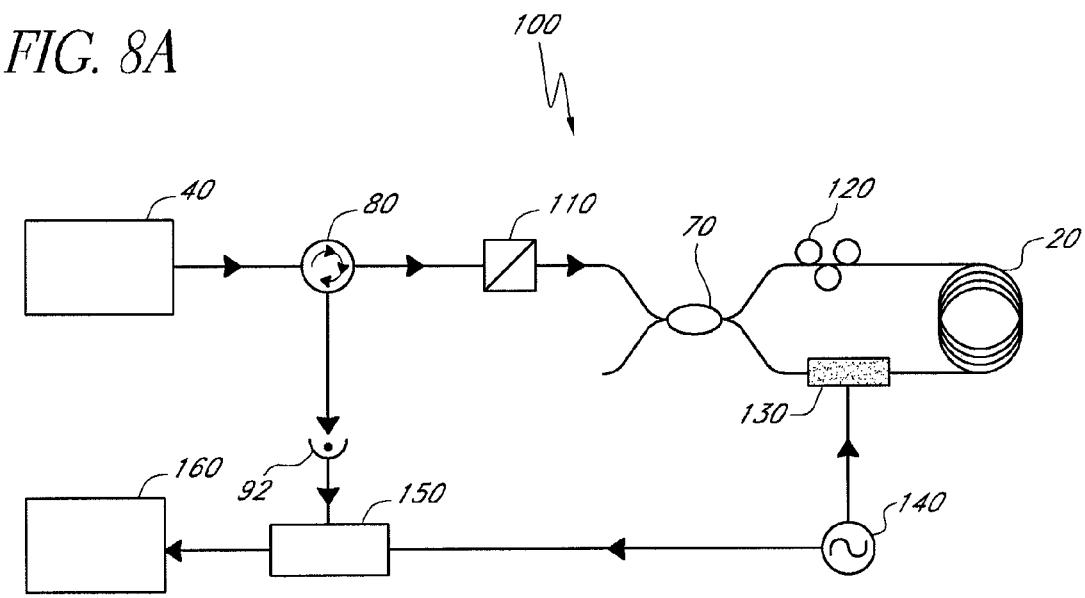
FIGS. 8A and 8B schematically illustrate two example sensors in accordance with certain embodiments described herein.

FIG. 8A schematically illustrates an example sensor 100 in accordance with certain embodiments described herein. The sensor 100 of FIG. 8A is another example of a fiber-optic gyroscope comprising a standard Sagnac loop which comprises the coil 20. The sensor 100 of FIG. 8 can be a FOG in the minimum configuration (see, e.g., H. C. Lefèvre, "The Fiber-Optic Gyroscope," Artech House, Inc., Norwood, Mass. (1993)). Light from the laser source 40 is transmitted to the optical circulator 80, through a polarizer 110, to the optical coupler 70 which is closed upon itself by a polarization controller 120, the optical fiber coil 20, and an electro-optic (EO) phase modulator 130. The phase modulator 130 can be used to bias the sensor 100 in quadrature, thus improving the sensitivity of the sensor 100. In certain embodiments, the polarizer 110 and the phase modulator 130 are fiber-based or fiber-pigtailed components which are commercially available from a number of vendors and manufacturers (e.g., JDS Uniphase Corp. of Milpitas, Calif.).

Figure 8B:
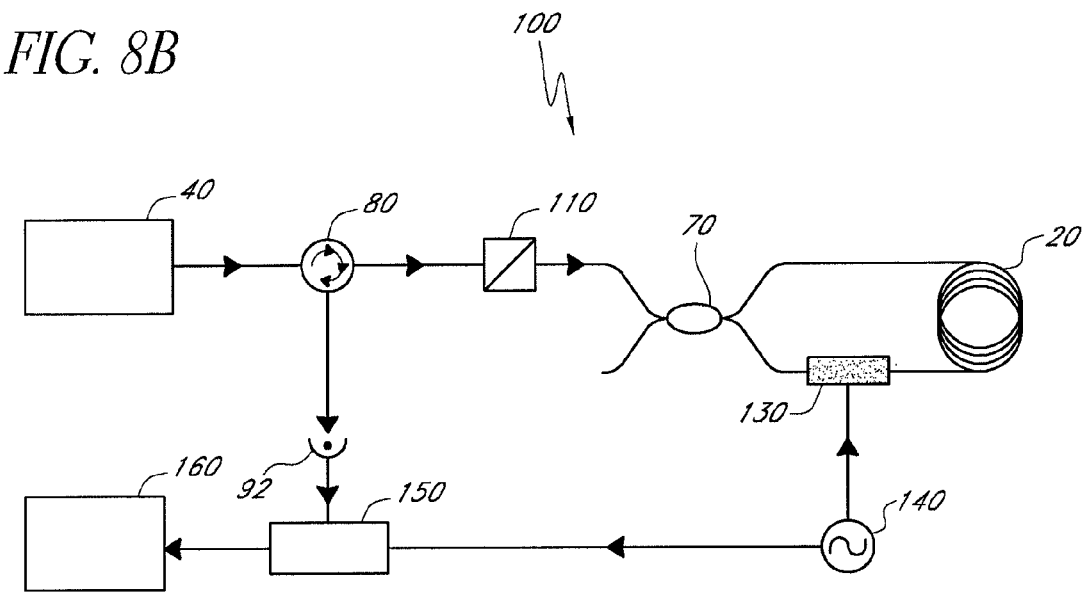

FIG. 8B schematically illustrates an example sensor 102 in accordance with certain embodiments described herein. The sensor 102 of FIG. 8B is another example of a fiber-optic gyroscope comprising a standard Sagnac loop which comprises the coil 20. The sensor 102 comprises a polarization-maintaining (PM) fiber downstream from the polarizer 110 (e.g., in the coil 20, between the polarizer 110 and the first optical coupler 70, and/or within the first optical coupler 70). In certain such embodiments, the entire optical path downstream from the polarizer 110 is PM fiber. In certain embodiments, the sensor 102 utilizes PM fiber throughout (i.e., downstream from the source 40). By utilizing PM fiber either along the entire optical path downstream from the polarizer 110 or throughout the sensor 102, certain embodiments obviate the use of the polarization controller 120 of the sensor 100. Certain such embodiments advantageously avoid the need to adjust the polarization controller 120 (either manually, which cannot be done for an actual FOG, or with complicated feedback systems, which add cost and complexity). The phase modulator 130 of certain embodiments is driven by a function generator 140 which is coupled to a lock-in amplifier 150 which outputs a signal to a computer system 160. The lock-in detection at the proper frequency of the sensor 100 in certain embodiments can advantageously improve the signal-to-noise ratio. With this phase modulation, the returning signal of interest is centered at the frequency of the phase modulation (i.e., at the proper frequency $f_0$).

In a manner similar to that discussed above with regard to the example configuration illustrated by FIG. 2, for the sensor 100 schematically illustrated by FIG. 8, the backscattered light due to only one of the counterpropagating signals propagates through the phase modulator 130. For example, for the first signal 52 propagating through the polarization controller 120 then through the rest of the coil 20 and then through the phase modulator 130, any backscattered light produced within the coil 20 will propagate towards the polarization controller 120 and away from the phase modulator 130 before reaching the first optical coupler 70. Conversely, for the second signal 56 propagating through the phase modulator 130, then through the coil 20, and then through the polarization controller 120, any backscattered light produced within the coil 20 will propagate through the phase modulator 130 before reaching the first optical coupler 70. The backscattered light that does not propagate through the phase modulator 130 is thus not phase modulated, and therefore does not contribute to the backscattering noise at the detection frequency. Such a configuration is different from other configurations (e.g., J. Zheng, "All-fiber single-mode fiber frequency-modulated continuous-wave Sagnac gyroscope," Optics Letters, Vol. 30, pp. 17-19 (2005) and J. Zheng, "Differential birefringent fiber frequency-modulated continuous-wave Sagnac gyroscope," IEEE Photonics Technology Letters, Vol. 17, pp. 1498-1500 (2005)) in which both backscattered signals are modulated so both contribute to the noise.

In addition, for the sensors 100, 102 schematically illustrated by FIGS. 8A and 8B, as well as the sensor 10 schematically illustrated by FIG. 1, both of the counterpropagating signals are frequency-modulated and are combined together to produce the third signal 60. Other configurations (e.g., B. Culshaw et al., "Frequency Modulated Heterodyne Optical Fiber Sagnac Interferometer," IEEE Trans. Microwave Theory and Technique, Vol. MTT-30, pp. 536-539 (1982)) do not modulate the frequency of the two counterpropagating signals of the coil 20 and combine these signals together.

Experimental results are provided below for the example sensor 100 of FIG. 8A with two different FOGs, each one utilizing a different optical fiber: a 200-m long standard optical fiber (SMF-28 fiber from Corning, Inc.) wound on an 8-cm-diameter spool, and a 235-m long air-core photonic-bandgap fiber (HC-1550-02 fiber from Crystal Fibre) wound on an 8-cm-diameter spool. The performance of the FOGs was studied by using two different optical sources: a standard erbium-doped superfluorescent fiber source (for the purpose of gathering baseline noise data), and a 200-kHz-linewidth external-cavity tunable laser. The frequency of the laser could be swept using frequency modulation (FM). In this case, the driving current of the laser was modulated, which produced a very small wavelength modulation bandwidth (estimated to be 1 pm). Alternatively, the laser frequency could be swept using a frequency sweep (FS), in which case the laser frequency was swept by tuning the external cavity of the semiconductor laser, consisting of an optical grating. This approach offered a wide optical modulation bandwidth (up to 100 nm).

Figure 9:
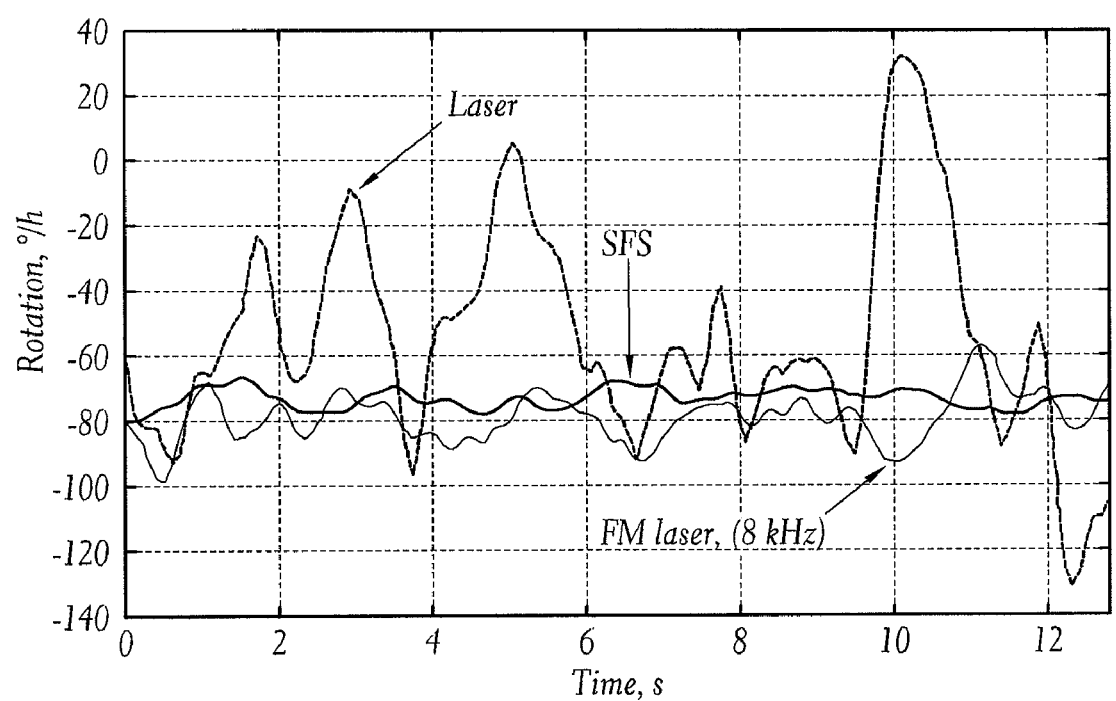
FIG. 9 is a plot of the rotation signal for the sensor of FIG. 8A with a SMF-28 fiber for three different optical sources: a SFS, a laser, and a frequency-modulated laser.

FIG. 9 illustrates the rotation signal for the sensor 100 with an SMF-28 fiber coil observed at the output of the lock-in amplifier 150 for three different optical sources: an SFS, a laser, and a frequency-modulated laser. The EO phase modulator 130 was driven by a sine wave from the function generator 140 at 400 kHz, the optical power returning to the detector 92 was −20 dBm, and the equivalent integration time of the lock-in amplifier 150 was 1.28 s ($BW_{det}$ of 0.78 Hz). The data of FIG. 9 were taken with the sensor 100 at rest and over a period of time approximately equal to ten times the equivalent integration time. As shown by FIG. 9, the noise with the SFS is much smaller than the noise of the laser, respectively 3°/h and 33°/h at one sigma. The increased noise observed when interrogating this FOG with the laser is due to backscattering, while the noise observed with the SFS is dominated by excess noise.

For the frequency-modulated laser, the laser frequency was modulated by applying sawtooth modulation to the laser driving current, at 8 kHz with a peak-to-peak amplitude of 1 mA. The amplitude of the frequency modulation was estimated to be 1 pm, and the frequency sweep speed S was estimated to be 4.4 nm/s. The frequency-modulated laser considerably reduced the backscattering noise to 7.6°/h as compared to the 33°/h of the non-frequency-modulated laser, about a factor of 4 improvement. As explained above, the reason for this improvement is that the backscattering noise is shifted off the proper frequency $f_0$ and filtered out by the lock-in amplifier, and the noise at $f_0$ drops. The shift is proportional to the frequency sweep speed S; the frequency shift equals 40 kHz for modulation at 1 kHz, and it equals about 140 kHz at 4 kHz. These experimental results therefore support the reduction of the backscattering noise by a frequency-swept laser. The amplitude noise of the laser used in FIG. 9 at the frequency of interest $f_0$ limits the performance of this sensor 100 in certain embodiments. A laser with lower noise would offer similar or better performance than the SFS in certain other embodiments, since a laser presents limited excess noise in comparison to a broadband source. In addition, FIG. 9 illustrates that a frequency-modulation of the laser over a very small (1 pm) optical bandwidth is sufficient to dramatically reduce the backscattering noise in the sensor 100.

Figure 10:
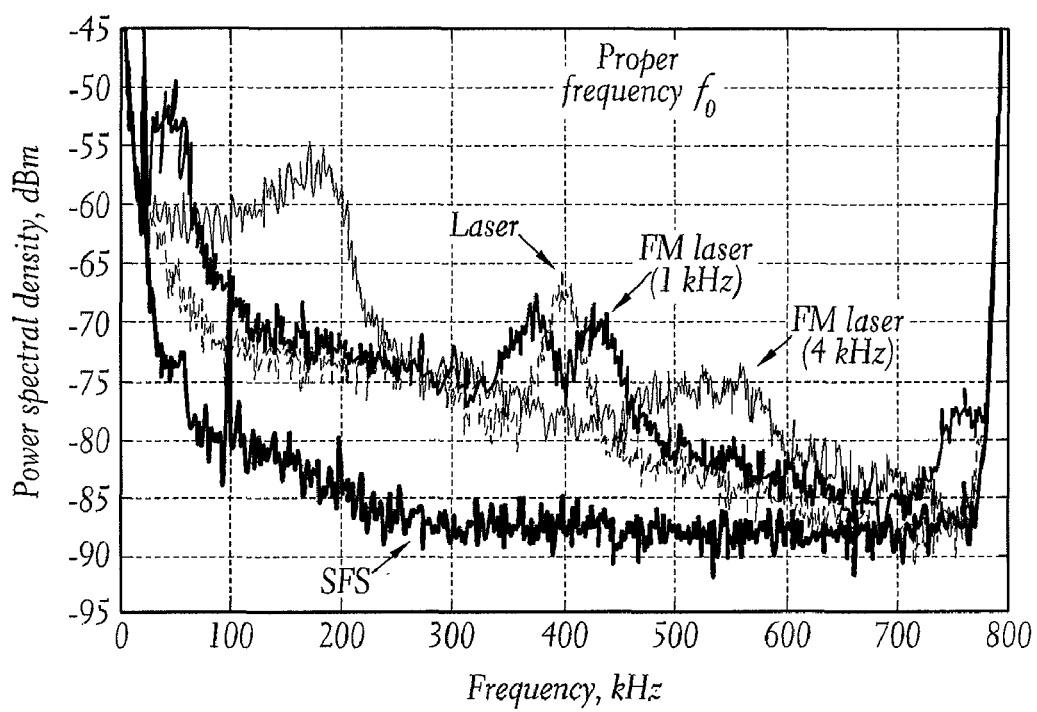
FIG. 10 is a plot of the RF spectra observed for the sensor of FIG. 8A with a SMF-28 fiber at rest.

FIG. 10 illustrates the RF spectrum observed at the output of the detector 92 for the sensor 100 with an SMF-28 fiber at rest. This spectrum agrees qualitatively well with the spectrum expected in accordance with FIG. 5B. When an SFS is used as the FOG source 40, the backscattering noise component observed at $f_0$ is very small. When the SFS is replaced with the laser source, strong backscattering noise is observed at $f_0$. By modulating the frequency of the laser, FIG. 9 shows that the backscattering noise is shifted away from, and on both sides of, the phase modulation frequency $f_0$. This frequency shift of the backscattering noise was observed around every multiple (zero included) of $f_0$. The laser frequency modulation clearly reduces the backscattering noise, although not sufficiently to reach the low noise level of the same FOG operated with an SFS (see FIG. 10). As described above, this frequency shift was observed to be proportional to the frequency sweep speed. FIG. 10 also shows that the backscattering reduction is limited in certain embodiments. The backscattering noise peaks can not be shifted further than the phase modulation frequency (i.e., $\Delta v_B$ must be smaller than $f_0$), or the noise shifted from the dc towards positive frequencies will be observed at the frequency of interest $f_0$. In contrast, in certain other embodiments, the backscattering noise is shifted much further to high frequencies by sweeping the frequency of the laser at a very high rate so that $\Delta v_B \gg f_0$, as explained further below. For example, rotation of the grating of the external cavity of the semiconductor laser can be used to obtain frequency rate as high as 100 nm/s.

The beat signal was observed to have a 50-kHz linewidth. As discussed earlier, this linewidth is smaller than twice the optical linewidth of the laser. Consequently, the beating waves are likely to be partially correlated, which is in good agreement with the 1.5-km coherence length of the laser.

Figure 11:
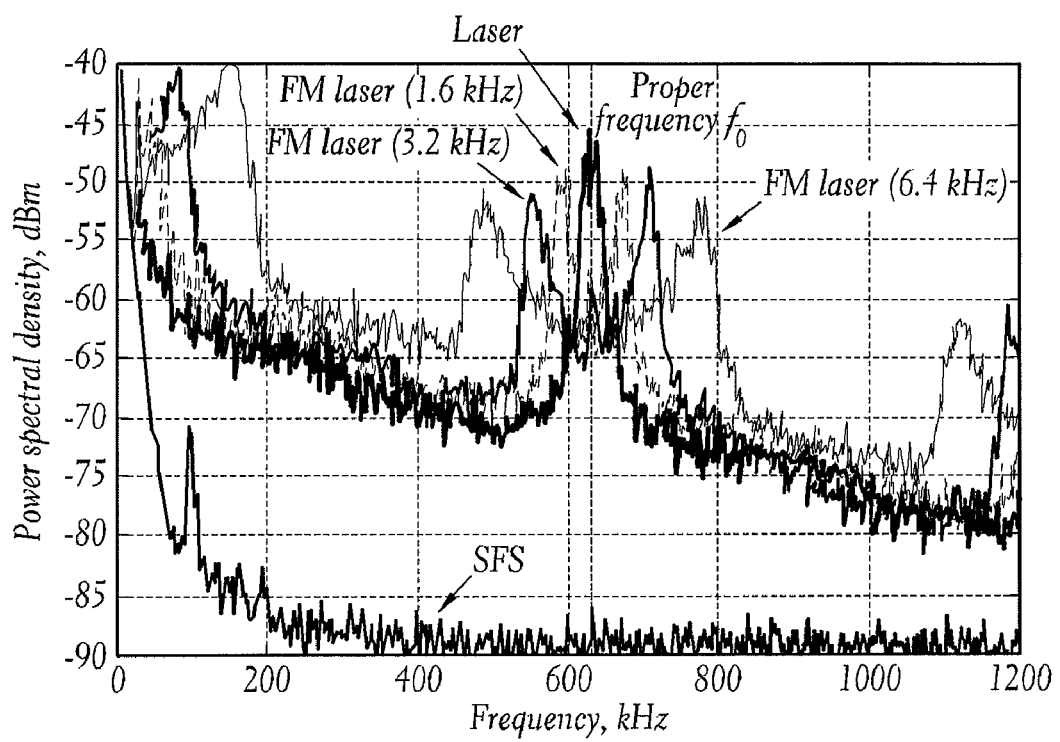
FIG. 11 is a plot of the RF spectra observed for the sensor of FIG. 8A with an air-core optical fiber at rest.

Similar trends were observed for the sensor 100 utilizing the air-core optical fiber coil 20. The EO phase modulator 130 was driven with a sine wave at 632 kHz, the optical power returning to the detector 92 was −24 dBm, and the equivalent integration time of the lock-in amplifier 150 was 1.28 s ($BW_{det}$ of 0.78 Hz). FIG. 11 illustrates the RF spectra observed at the output of the detector 92. The main difference compared to the RF spectra for the SMF-28 fiber coil 20 of FIG. 10 is the enhanced (factor of 10) backscattering noise by 20 dB (electrical), due to the enhanced backscattering coefficient in the air-core optical fiber in comparison to a standard fiber. The laser frequency modulation reduces the backscattering noise, just as it did with the standard fiber coil, but also not enough to reach the low-noise performance of the SFS. When the laser frequency was modulated at 3.2 kHz, and at a speed such that the frequency rate was S≈1.8 nm/s (or 232 GHz/s), the noise was observed to be 264°/h, which is roughly 30 times the noise of 7.7°/h observed with the SFS. The noise magnitude was measured at one sigma over 10 times the equivalent integration time of the lock-in amplifier 150. This rate S induced a frequency shift in the noise peak of ~80 kHz (see FIG. 11). Although this noise shift is not as high as the optimum frequency of $f_0/2$ according to the second mode of operation described above, the conditions under which this FOG was tested, and the reduction in noise it produced, provide an illustration of the second mode of operation. This embodiment demonstrates a significant reduction of the backscattering noise in an air-core FOG in this second mode of operation.

As described above, the first mode of operation includes modulating the frequency at a much higher rate than in the second mode of operation. The backscattering noise for either an air-core or a conventional optical fiber coil 20 is then shifted to much higher frequencies ($\Delta v_B \gg f_0$) by sweeping the frequency of the laser at a very high rate (e.g., as high as 100 nm/s). This can be accomplished in practice, e.g., by rotating the grating of the external cavity of the semiconductor laser. In this case, as described above, the energy in all of the noise peaks in the vicinity of all the harmonics of $f_0$ is spread out over a very large frequency range, and very little overlaps with the frequency of interest $f_0$. In the experiment that aimed to prove this point, the detected optical power was −20 dBm, the lock-in equivalent integration time was 38 s, and the laser frequency was swept over 30 nm at a speed of 100 nm/s with a sawtooth shape. The laser was amplified with an erbium-doped fiber amplifier. The observed noise of the air-core FOG driven by the frequency-swept source was 16°/h (measured at one sigma over 100 s), which is only 3 times the noise observed with the SFS (5.2°/h). The noise was independent of the optical bandwidth: sweeping the laser frequency over 10 nm or 60 nm did not significantly change the noise magnitude. In addition, this performance was obtained despite optical power fluctuations as high as 5 dB, which were caused by the fact that the length of fiber between the laser and the input/output polarizer of the FOG did not maintain polarization.

Figure 12A:
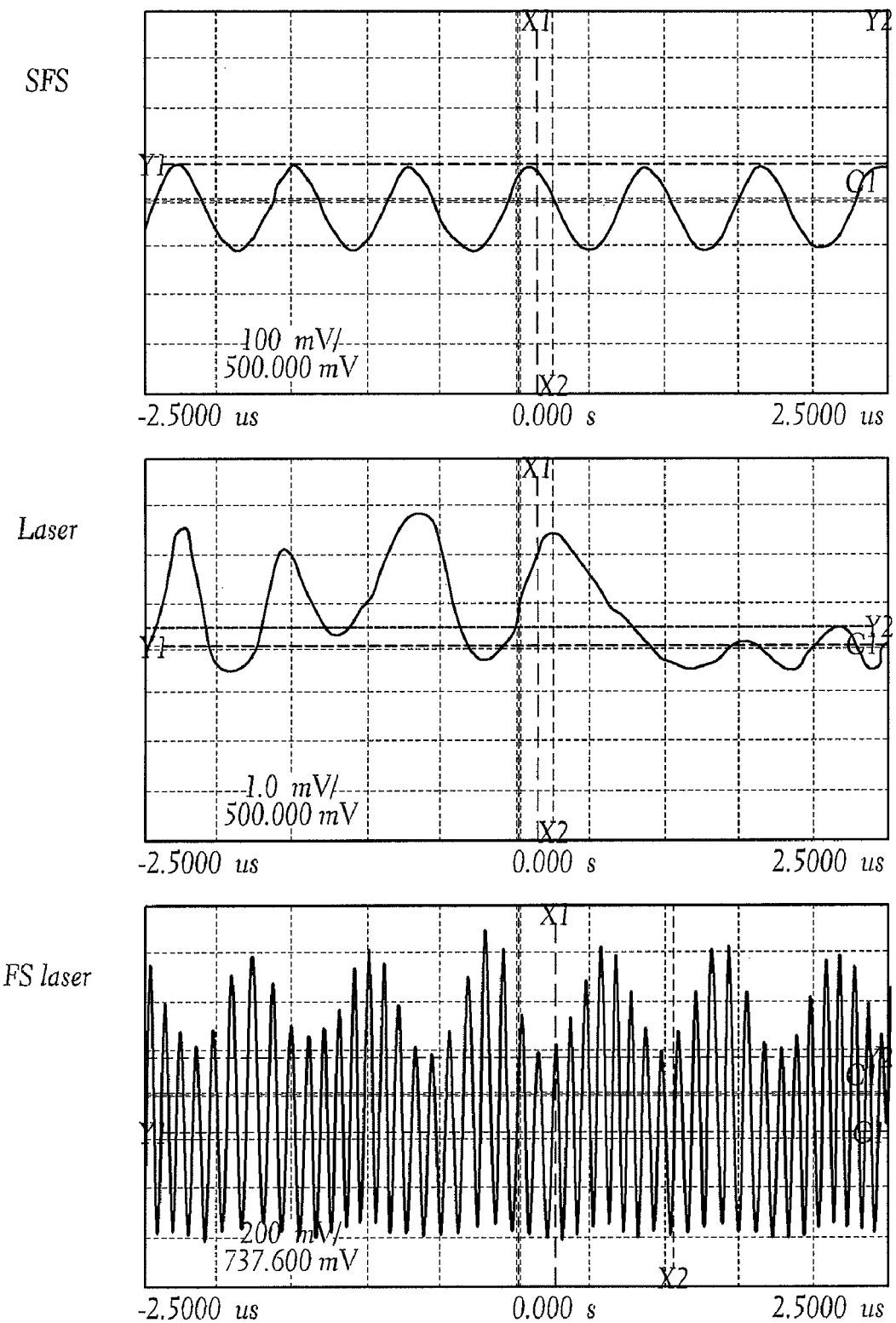
FIGS. 12A and 12B illustrate some temporal and spectral characteristics of the detector signal for the air-core FOG at rest.
Figure 12B:
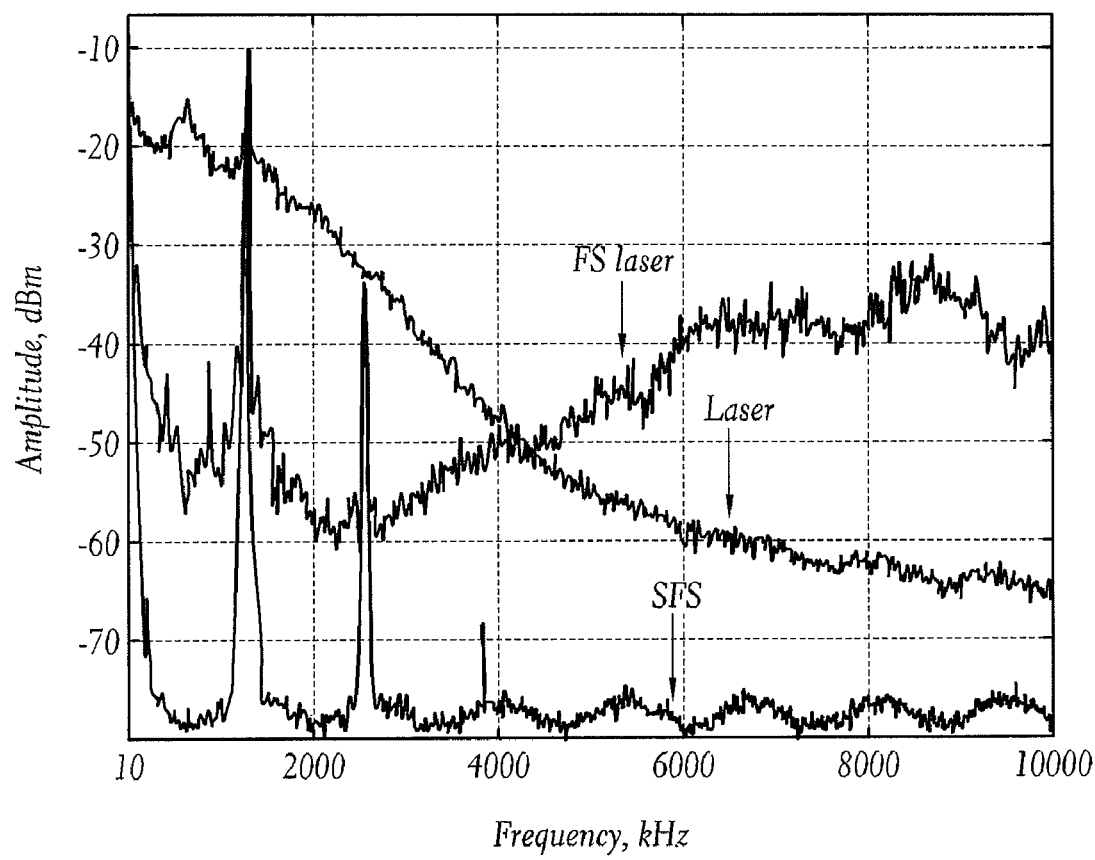

FIGS. 12A and 12B present some temporal and spectral characteristics of the detector signal for the air-core FOG at rest. When the FOG is driven by an SFS, the detected signal is the expected component at $2f_0$, as seen in the top graph of FIG. 12A. When the SFS is replaced by the laser, this component is hidden by the backscattering noise, as seen in the middle graph of FIG. 12A. With the frequency-swept laser, the expected component at $2f_0$ is observed, with over-modulation due to the backscatter beat noise (see in the bottom graph of FIG. 12A). From $\Delta v_B = S \cdot n \cdot (L-2z)/c$, and assuming the average position of the scatterers is z=0 (or L, since 0 and L are the two positions where scatterers contribute the most to the noise), the expected beat frequency is 9.7 MHz, which is in very good agreement with the 9 MHz maximum observed with the RF spectrum analyzer, as shown in FIG. 12B.

Figure 13:
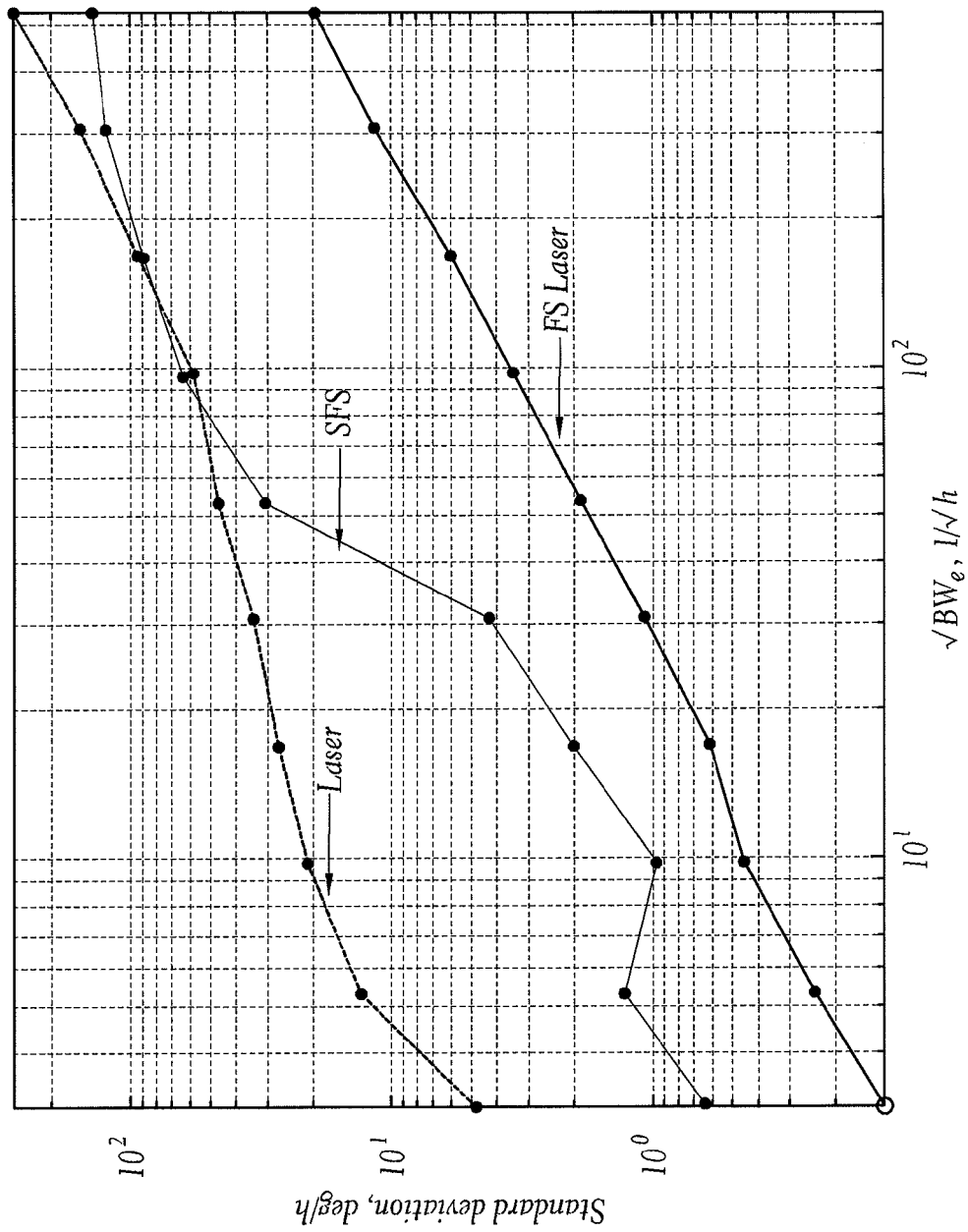
FIG. 13 illustrates the dependence of the noise on the square root of the detection bandwidth for a standard fiber coil.

FIG. 13 presents the measured dependence of the noise on the square root of the detection bandwidth for the FOG using the SMF-28 fiber in the coil 20. As discussed above, the integration time of the lock-in amplifier 150 in certain embodiments is advantageously selected to be large compared to the period of the frequency sweep. FIG. 13 illustrates the importance of the ratio between the detection bandwidth of the lock-in amplifier 150 and the sweep rate of the laser source 40. In a random-walk regime, the expected linear dependence for the laser-driven and the SFS-driven FOG were observed. In addition, the noise with the frequency-swept laser was observed to be as high as in the laser-driven FOG for large bandwidth, and to approach the noise of the broadband source for smaller detection bandwidth.

As described herein, a frequency-swept narrow-band laser (e.g., a distributed feedback fiber laser) can advantageously be used in a fiber optic sensor (e.g., a FOG). The backscattering noise can be reduced (e.g., by a factor of 4) in certain embodiments compared to a laser-driven FOG. Punctual reflections in the coil 20 can cause coherent backscattering noise, which can be reduced by frequency-modulating the laser, so the backscattering noise can be reduced further (e.g., by a factor of 10) by removing sources of reflections in the FOG (e.g., by replacing fiber connectors with fusion splices at all the fiber-to-fiber connections). Frequency-modulating the laser source 40 can also reduce coherent noise arising from interference between one or both of the main (or primary) signals and reflections occurring at punctual interfaces along the Sagnac loop. Such reflections include, but are not limited to, spurious reflections at a fiber-to-fiber-splice, Fresnel reflection at internal interfaces inside a component (e.g., the phase modulator) located in the coil 20, or Fresnel reflection at the optical connection between the fiber and the EO modulator chip, for example when the chip is a $LiNbO_3$ chip.

With a standard optical fiber, the noise performance of the FOG driven by the frequency-swept narrow-band laser is almost as good as with a broadband source. The use of a frequency-swept narrow-band laser in certain embodiments advantageously provides an improved sensitivity (e.g., reduced noise) and improved stability (e.g., mean wavelength stability) for all FOGs driven with a laser. The further use of an air-core fiber affords the additional advantages of an improved thermal stability, a reduced Kerr-induced phase drift, and a reduced sensitivity to magnetic fields. The backscatter noise reduction of certain embodiments mainly depends on the frequency-sweep speed, and sweeping the laser frequency over only 1 pm was sufficient to achieve substantial reduction of the backscatter noise. Certain embodiments described herein allow easier control of the mean wavelength of the laser source in comparison to a broadband source, thus offering better long-term stability for the FOG scale factor.

Figure 14:
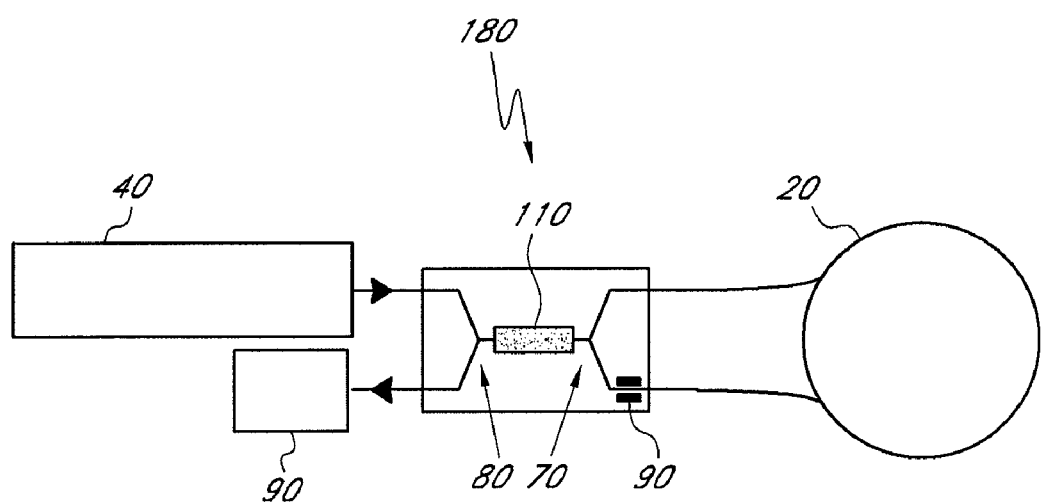
FIG. 14 schematically illustrates an example sensor in accordance with certain embodiments described herein.

FIG. 14 schematically illustrates an example sensor 170 in accordance with certain embodiments described herein. The sensor 170 of FIG. 14 is another example of a fiber-optic gyroscope comprising a standard Sagnac loop which comprises the coil 20. The sensor 170 of FIG. 14 is an integrated optic chip in which the FOG components are all made on a chip (LiNbO$_3$), in accordance with the standard method to make a commercial FOG. In certain such embodiments, the key components of the sensor 180, including but not limited to the first optical coupler 70 (e.g., a Y junction), the second optical coupler 80 (e.g., a Y junction), the polarizer 110, and the phase modulator 130, are all fabricated using standard technology on the same integrated optic chip, for example on LiNbO$_3$, which presents certain well-recognized advantages of compactness, mechanical stability, and ease and reduced cost of large-scale manufacturing. In certain embodiments, the coil 20 comprises a polarization-maintaining fiber. In certain other embodiments, a polarization controller can be positioned at a point along the coil 20 to control the birefringence of the coil 20 and ensure that the signal output state of polarization is aligned with respect with the polarizer transmission axis, thereby providing polarization reciprocity. In certain embodiments, the coil 20 comprises an air-core fiber.

In certain embodiments, this frequency modulation described herein can be used with many other implementations of the basic FOG configurations and regardless of the specific technologies used to fabricate the components or the manner in which the FOG is operated. For example, frequency modulation can be used whether the FOG is operated open loop or closed loop, independently of the exact scheme used to close the loop, and independently of the modulation scheme or any other signal processing scheme implemented in the FOG as a whole for any purpose.

Figure 15:
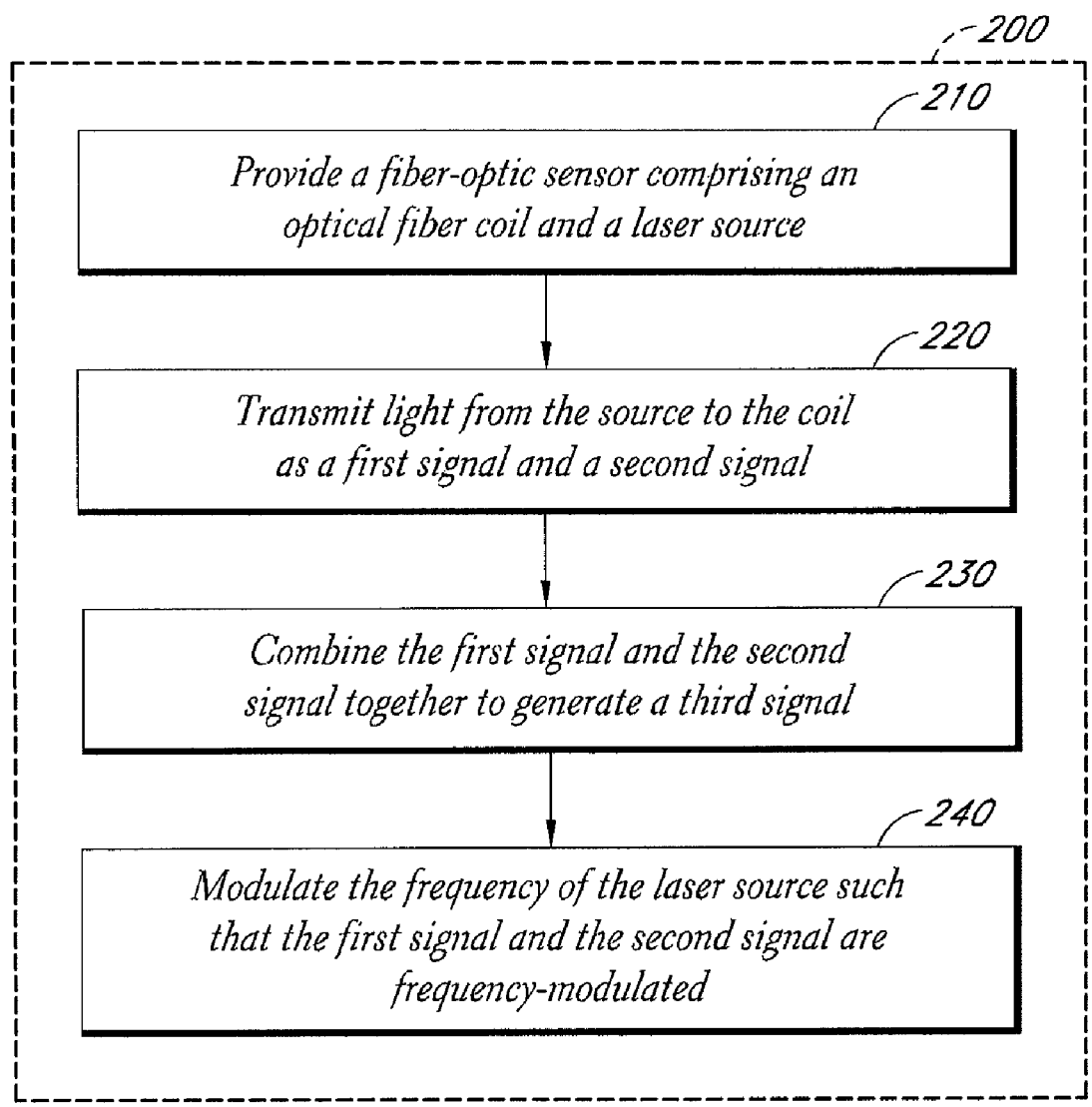
FIG. 15 is a flow diagram of an example method of operating a fiber-optic sensor in accordance with certain embodiments described herein.

FIG. 15 is a flow diagram of an example method 200 of operating a fiber-optic sensor in accordance with certain embodiments described herein. The method 200 comprising providing a fiber-optic sensor comprising an optical fiber coil and a laser source optically coupled to the coil in an operational block 210. The method 200 further comprises transmitting light from the source to the coil as a first signal and a second signal in an operational block 220. The first signal propagates along the coil in a first direction and the second signal propagates along the coil in a second direction opposite to the first direction. The optical paths of the first signal and the second signal are substantially reciprocal with one another. The method 200 further comprises combining the first signal and the second signal together to generate a third signal in an operational block 230. The method 200 further comprises modulating a frequency of the laser source such that the first signal and the second signal are frequency-modulated in an operational block 240. In certain embodiments, the third signal comprises a backscattering noise portion and a remaining portion, and modulating the frequency of the laser source shifts the backscattering noise portion to at a beat frequency different from a frequency of the remaining portion.

Of the possible effects that cause the error signal due to backscattering to fluctuate, the primary contribution is random phase fluctuations in the source. The other contributions, such as temperature transients in the fiber, have a much longer characteristic time constant and will generally lead to drift in the FOG signal output over time, rather than a random walk noise (see for example K. Kråakenes and K. Bløtekjaer, Effect of Laser Phase Noise in Sagnac Interferometers, Journal of Lightwave Technology, Vol. 11, No. 4, April 1993). As described above, the primary approach to reduce the effect of coherent backscattering noise has previously been to use a broadband source to interrogate the FOG. Coherent backscattering noise is reduced when using a broadband source because the source coherence length $L_c$ is then very short compared to the length of the coil. As a result, only light scattered by scatterers located within approximately one coherence length of fiber centered at the coil halfway point contributes to coherent backscattering noise. Light scattered by scatterers located outside this region has a delay relative to the primary wave that is longer than the source coherence time and interferes incoherently, thus it does not contribute to significant fluctuations in the error signal. Therefore, in order to reduce the error due to scattering, one approach is to make the region of fiber that contributes to the coherent backscattering smaller and smaller by reducing the coherence length of the source, or, equivalently, using a broadband light source. For a broadband source this region is generally only a few microns or tens of microns in length.

Another approach to reduce the RMS fluctuations in the error signal due to coherent backscattering and reflections (e.g., punctual reflections) in accordance with certain embodiments described herein is to use a highly coherent source, i.e., a source with a coherence length longer than the coil length. From the discussion above, increasing the source coherence length increases the length of fiber that contributes to coherent backscattering noise, and it therefore generally leads to a larger backscattering noise and thus a larger FOG random walk. However, the backscattering noise increases only up to the point where the coherence length of the source is equal to the length of the coil. This increase is of course due to the fact that more scatterers contribute to coherent scattering noise. But when the coherence length of the source is increased beyond the length of the coil, two effects take place. First, the length of fiber that contributes to coherent backscattering noise no longer increases, because all the scatterers along the entire coil fiber already contribute to coherent backscattering noise. Second, increasing the coherence length of the source leads to smaller and smaller random phase fluctuations in the photons emitted by the source. Since these fluctuations are what ultimately gives rise to the fluctuations in the error signal, the fluctuations in the backscattering noise decrease, and so does the random walk. Therefore, since the region that contributes coherently to the backscattered signal is now fixed and the random phase fluctuations of the source can be made smaller by increasing the coherence length, the RMS fluctuations in the error signal also decrease. This leads to a reduction in the FOG random walk due to coherent backscattering, and a concomitant improvement in the minimum detectable rotation rate. Certain such embodiments can be used with various sensor configurations, including but not limited to those of FIGS. 1, 2, 8A, 8B, and 14.

Figure 16:
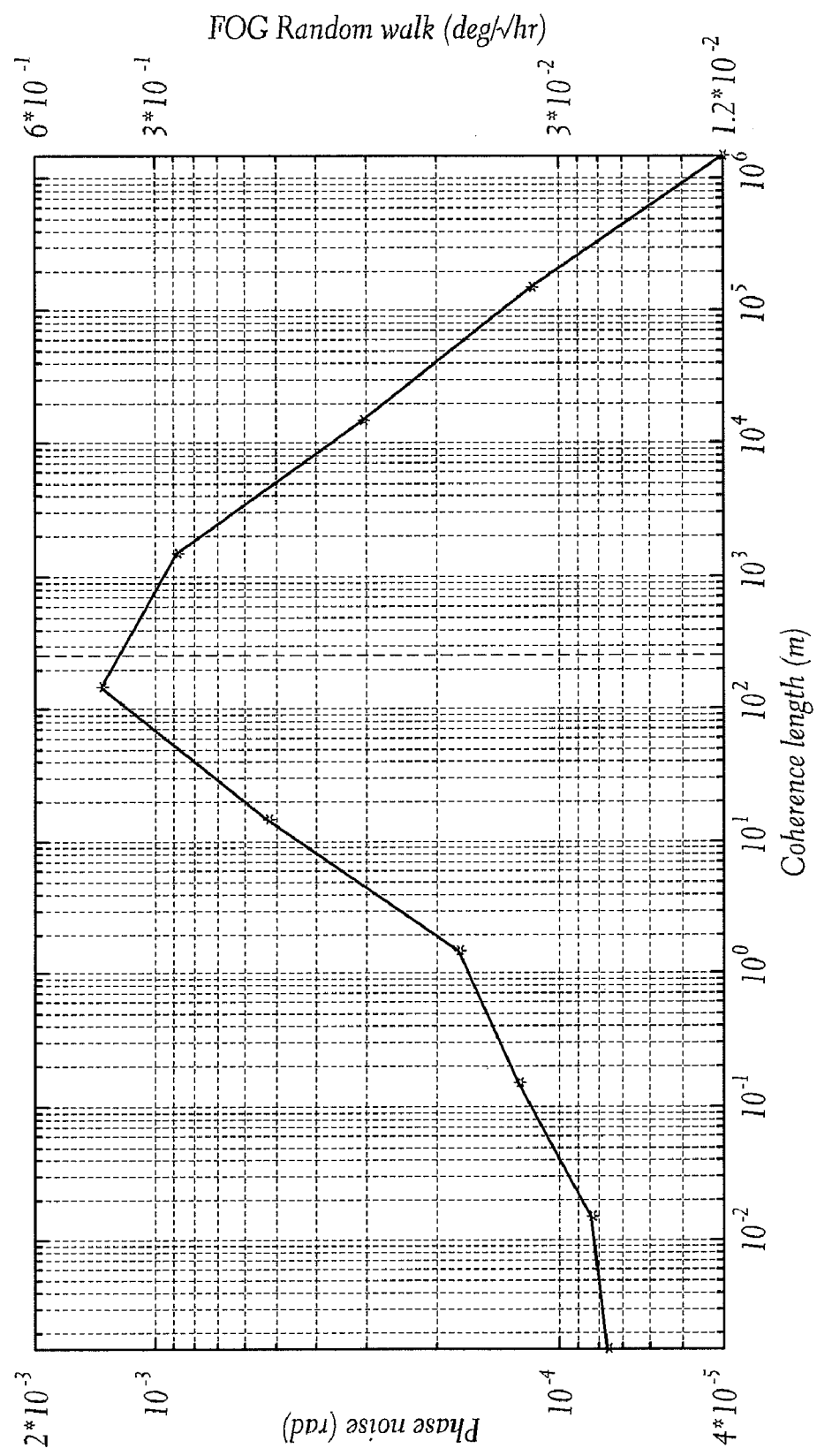
FIG. 16 shows the results of a numerical theoretical model of certain embodiments utilizing a source coherence length greater than the coil length.

FIG. 16 shows the results of a numerical theoretical model used to verify the above-described principle. The model was used to numerically simulate the interactions between the random phase fluctuations of a source with the local inhomogeneities in the fiber loop for various coherence lengths. FIG. 16 shows the results of this simulation for one particular coil consisting of 255 meters of fiber with statistical properties equivalent to SMF-28 fiber, investigating the effects on noise for only one random distribution of scatterers. The numerical model can also average the phase noise (and the corresponding random walk) over all possible scatterers distributions, for which the model would yield the same curve but with a slightly different shape and vertical axis absolute scale (not shown for clarity). The vertical dashed line indicates the coherence length equal to the coil length ($L_c=L$). As shown in FIG. 16, the FOG random walk is relatively small for sources with a short coherence length. As the coherence length is increased, the random walk also initially increases. Once the coherence length exceeds the length of the coil, however, the random walk due to coherent backscattering decreases, as described above.

The validity of this model was confirmed with the experimental demonstration of a fiber optic gyroscope driven by a frequency-modulated laser and with parameters matching those used in the simulation. The experimental configuration utilized an external cavity laser with a 200-kHz full-width-at-half-maximum linewidth (or a coherence length of about 1.5 km) coupled into a minimum configuration FOG, as shown in FIG. 8A, with a 240-meter coil of SMF-28 fiber. The FOG was biased at the proper coil frequency with a fiber-pigtailed electro-optic phase modulator 130. The returning signal was measured with a P-I-N photodiode and demodulated using a lock-in amplifier with a bandwidth of 1 kHz. This experimental configuration exhibited a FOG random walk of 0.49 deg/√hr. The numerical model predicted an average random walk of 0.45 deg/√hr, calculated over all possible scatterers distributions, showing very close agreement with our experimental results with one particular fiber and confirming the validity of the simulations.

FIG. 16 shows that in principle, the coherence length of the source in certain embodiments can be selected to be as long as possible to reduce the backscattering noise as much as possible. For example, increasing the coherence length to about 150 kilometers will result in a coherent backscattering noise reduction of a factor of 15 from its peak value. The reduction is roughly linear on a log-log scale, so the net noise reduction can be characterized, again in the particular example of this fiber, by a factor of ten every time the coherence length is increased by a factor of 200. In certain embodiments, however, it can be sufficient to reduce the backscattering noise to just below the next dominant source of noise, for example shot noise.

The numerical model used to generate these results of FIG. 16 did not take into account other sources of phase noise that might be present in a light source when its degree of coherence becomes extremely high. Such sources of noise include spontaneous emission noise, relative intensity noise (RIN), and excess noise. When these sources of noise are present, the curve in FIG. 16 no longer drops indefinitely in the $L_c>L$ region. Instead, above some critical coherence length the curve stops decreasing and likely levels off to an asymptotic value. This asymptotic level corresponds to the maximum amount of coherent backscattering noise reduction possible with $L_c>L$ and this particular source. The amount of noise reduction achievable with a given source can easily be measured with a fiber optic gyroscope, as described above in relation to the experimental results described above.

Because the random walk initially increases with increasing coherence length, most previously-existing noise reduction schemes have focused on reducing the source coherence length. Previous work has not considered the regime when the coherence length is much longer than the length of the loop and has not predicted the performance described above. Because of the advantages of narrowband sources discussed above, such as stable center wavelength and negligible excess noise, certain embodiments utilizing a FOG with a highly coherent source (i.e., a source with a coherence length that exceeds the coil length) offers significant advantages over more traditional methods.

In certain embodiments, a ratio of the coherence length to the length of the coil is greater than 1, greater than 1.1, greater than 1.5, greater than 2, greater than 5, greater than 10, greater than 100, or greater than 1000. In certain embodiments, the fiber-optic sensor utilizes both frequency modulation and a coherence length longer than the length of the coil. In certain other embodiments, the fiber-optic sensor utilizes either frequency modulation or a coherence length longer than the length of the coil.

Figure 17:
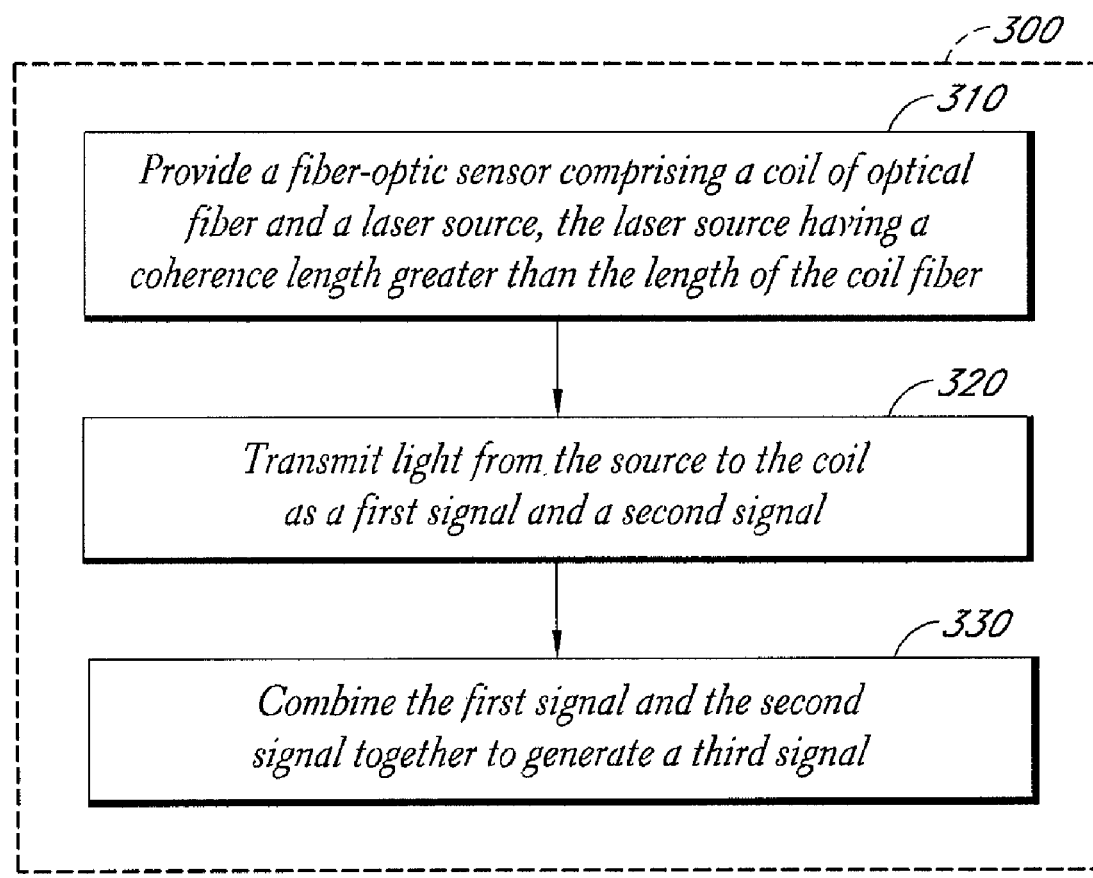
FIG. 17 is a flow diagram of an example method of operating a fiber-optic sensor in accordance with certain embodiments described herein.

FIG. 17 is a flow diagram of an example method 300 of operating a fiber-optic sensor in accordance with certain embodiments described herein. The method 300 comprising providing a fiber-optic sensor comprising a coil of optical fiber having a length and a laser source optically coupled to the coil fiber in an operational block 310. The laser source is selected to have a coherence length greater than the length of the coil fiber. The method 300 further comprises transmitting light from the source to the coil as a first signal and a second signal in an operational block 320. The first signal propagates along the coil in a first direction and the second signal propagates along the coil in a second direction opposite to the first direction. The optical paths of the first signal and the second signal are substantially reciprocal with one another. The method 300 further comprises combining the first signal and the second signal together to generate a third signal in an operational block 330.

Various embodiments have been described above. Although the invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An optical sensor comprising:
   a plurality of loops; and
   a frequency-modulated laser source optically coupled to the plurality of loops, wherein the plurality of loops is configured to counterpropagate a first optical signal and a second optical signal, wherein the optical paths of the first optical signal and the second optical signal are substantially reciprocal with one another and the first optical signal and the second optical signal are combined together after counterpropagating through the plurality of loops to generate a third optical signal.

2. The sensor of claim 1, wherein the sensor is a Sagnac-based fiber-optic gyroscope and the third optical signal is indicative of rotations of the plurality of loops.

3. The sensor of claim 1, further comprising at least one optical coupler optically coupled to the plurality of loops and to the laser source.

4. The sensor of claim 3, wherein the at least one optical coupler comprises a first optical coupler comprising a first port, a second port, and a third port, the first port receiving light generated by the laser source, the second port optically coupled to a first portion of the plurality of loops and the third port optically coupled to a second portion of the plurality of loops.

5. The sensor of claim 4, wherein the first optical signal is transmitted by the second port to the first portion of the plurality of loops and is transmitted by the second portion of the plurality of loops to the third port and transmitted by the third port to the first port, and the second optical signal is transmitted by the third port to the second portion of the plurality of loops and is transmitted by the first portion of the plurality of loops to the second port and transmitted by the second port to the first port.

6. The sensor of claim 4, wherein the at least one optical coupler further comprises a second optical coupler comprising a first port, a second port, and a third port, the first port receiving light generated by the laser source, the second port optically coupled to the first port of the first optical coupler, and the third port optically coupled to a detection system.

7. The sensor of claim 6, wherein light from the laser source received by the first port of the second optical coupler is transmitted through the second port of the second optical coupler to the first port of the first optical coupler, and the third optical signal received from the first port of the first optical coupler by the second port of the second optical coupler is transmitted through the third port of the second optical coupler to the detection system.

8. The sensor of claim 1, wherein the plurality of loops comprises an air-core photonic-bandgap fiber.

9. The sensor of claim 1, wherein the laser source comprises an external-cavity semiconductor diode laser or a distributed feedback fiber laser.

10. The sensor of claim 1, further comprising a detection system configured to receive the third optical signal, the detection system comprising a filter bandwidth, wherein the third optical signal comprises a backscattering noise portion and a remaining portion, and the filter bandwidth is selected to filter out the backscattering noise portion.

11. The sensor of claim 1, wherein the sensor is an optical gyroscope.

12. A method of operating an optical sensor, the method comprising:
providing a plurality of loops;
receiving frequency-modulated light from a laser source as a first frequency-modulated optical signal and a second frequency-modulated optical signal counterpropagating through the plurality of loops, wherein the optical paths of the first frequency-modulated optical signal and the second frequency-modulated optical signal are substantially reciprocal with one another; and
combining the first frequency-modulated optical signal and the second frequency-modulated optical signal together to generate a third optical signal.

13. The method of claim 12, wherein the third optical signal comprises a backscattering noise portion and a remaining portion, and the backscattering noise portion is shifted to a beat frequency different from a frequency of the remaining portion.

14. An optical gyroscopic sensor comprising:
a plurality of loops having a length; and
a laser source optically coupled to the plurality of loops, the laser source having a coherence length longer than the length of the plurality of loops wherein the plurality of loops is configured to counter-propagate a first optical signal and a second optical signal, wherein the optical paths of the first optical signal and the second optical signal are substantially reciprocal with one another and the first optical signal and the second optical signal are combined together after counter-propagating through the plurality of loops to generate a third optical signal.

15. The sensor of claim 14, wherein the sensor comprises a standard Sagnac loop comprising the plurality of loops.

16. The sensor of claim 14, wherein a ratio of the coherence length to the length of the plurality of loops is greater than 1.

17. The sensor of claim 14, wherein a ratio of the coherence length to the length of the plurality of loops is greater than 2.

18. The sensor of claim 14, wherein a ratio of the coherence length to the length of the plurality of loops is greater than 10.

19. The sensor of claim 14, wherein a ratio of the coherence length to the length of the plurality of loops is greater than 1000.

20. A method of operating an optical sensor, the method comprising:
providing an optical gyroscopic sensor comprising a plurality of;
receiving light from a laser source optically coupled to the plurality of loops as a first optical signal and a second optical signal counter-propagating through the plurality of loops, wherein the optical paths of the first optical signal and the second optical signal are substantially reciprocal with one another, the laser source having a coherence length longer than the length of the plurality of loops; and
combining the first optical signal and the second optical signal together to generate a third optical signal.

21. The method of claim 20, wherein the optical gyroscopic sensor comprises a Sagnac loop comprising the plurality of loops.

* * * * *

UNITED STATES PATENT AND TRADEMARK OFFICE
CERTIFICATE OF CORRECTION

PATENT NO. : 8,289,521 B2  Page 1 of 1
APPLICATION NO. : 13/027873
DATED : October 16, 2012
INVENTOR(S) : Blin et al.

It is certified that error appears in the above-identified patent and that said Letters Patent is hereby corrected as shown below:

On the Title Page, Item (54), and in the specification, Column 1, line 1, Title: Change "FIBER-OPTIC" to --OPTICAL--.

In the Claims:

In column 22, at line 27, In Claim 20, change "of;" to --of loops;--.

Signed and Sealed this
Eighteenth Day of June, 2013

Teresa Stanek Rea
*Acting Director of the United States Patent and Trademark Office*